United States Patent
Morrow et al.

(10) Patent No.: US 11,636,435 B2
(45) Date of Patent: *Apr. 25, 2023

(54) OPTIMIZING BENEFITS SELECTION IN VIEW OF BOTH MEMBER POPULATION AND ORGANIZATIONAL PREFERENCES

(71) Applicant: AON GLOBAL OPERATIONS SE, SINGAPORE BRANCH, Singapore (SG)

(72) Inventors: Michael Morrow, Denver, CO (US); Salina Shah, Boston, MA (US); Todor Penev, Atlanta, GA (US); Andy Rallis, Singapore (SG); Kartick Subramanian, Singapore (SG)

(73) Assignee: Aon Global Operations SE, Singapore Branch, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/880,539

(22) Filed: May 21, 2020

(65) Prior Publication Data

US 2021/0103895 A1 Apr. 8, 2021

Related U.S. Application Data

(63) Continuation of application No. 16/554,157, filed on Aug. 28, 2019, now Pat. No. 10,664,806, which is a
(Continued)

(51) Int. Cl.
*G06Q 10/10* (2012.01)
*G06Q 40/08* (2012.01)
(Continued)

(52) U.S. Cl.
CPC ......... *G06Q 10/1057* (2013.01); *G06N 20/00* (2019.01); *G06Q 40/08* (2013.01)

(58) Field of Classification Search
None
See application file for complete search history.

(56) References Cited

U.S. PATENT DOCUMENTS

| | | | |
|---|---|---|---|
| 5,956,691 A | 9/1999 | Powers | |
| 6,631,362 B1 * | 10/2003 | Ullman | G06Q 10/10 706/21 |

(Continued)

FOREIGN PATENT DOCUMENTS

| | | |
|---|---|---|
| CA | 2357268 A1 | 9/2001 |
| WO | 2001033410 | 5/2001 |

(Continued)

OTHER PUBLICATIONS

"TailorWell Launches First Online Health Insurance Comparison Tool Targeted Specifically for Unique Needs of Small Businesses in Washington and Oregon", COMTEX News Network, Inc. dated Nov. 18, 2015 (Year: 2015).*

(Continued)

*Primary Examiner* — Alexander G Kalinowski
*Assistant Examiner* — Blane A Lickteig
(74) *Attorney, Agent, or Firm* — Gardella Grace P.A.

(57) ABSTRACT

The present disclosure relates to systems and methods for optimizing benefits plan options offered by an organization through balancing derived population preferences with organizational preferences by analyzing historical selections made by individuals. Census data dividing members of an organization into census divisions may be applied to machine learning algorithm(s) to derive estimated selection preferences of the members. Using selection preferences, costs of various product offering scenarios and overall member satisfaction estimates of the scenarios may be
(Continued)

calculated. Product offering scenarios meeting member preference criteria and organizational budget criteria may be presented for review.

18 Claims, 25 Drawing Sheets

Related U.S. Application Data continuation-in-part of application No. 15/900,705, filed on Feb. 20, 2018, now Pat. No. 10,402,788.

(60) Provisional application No. 62/592,034, filed on Nov. 29, 2017.

(51) Int. Cl.
  G06N 20/00 (2019.01)
  G06Q 10/1057 (2023.01)

(56) References Cited

U.S. PATENT DOCUMENTS

| | | | |
|---|---|---|---|
| 10,402,788 | B2 | 9/2019 | Morrow et al. |
| 2002/0049617 | A1 | 4/2002 | Lencki et al. |
| 2002/0095316 | A1 | 7/2002 | Toan et al. |
| 2002/0103680 | A1 | 8/2002 | Newman |
| 2002/0169727 | A1* | 11/2002 | Melnick .............. G06Q 10/1057 705/400 |
| 2004/0138950 | A1 | 7/2004 | Hyman et al. |
| 2009/0106656 | A1 | 4/2009 | Handy et al. |
| 2011/0201902 | A1 | 8/2011 | Shiga et al. |
| 2012/0296455 | A1 | 11/2012 | Ohnemus et al. |
| 2014/0142990 | A1 | 5/2014 | Manjarekar |
| 2014/0195269 | A1 | 7/2014 | Sircar et al. |
| 2015/0339446 | A1* | 11/2015 | Sperling ................ G16Z 99/00 705/3 |
| 2016/0005129 | A1* | 1/2016 | Chavarria .............. G06Q 40/08 705/4 |
| 2016/0378932 | A1 | 12/2016 | Sperling et al. |
| 2017/0103368 | A1* | 4/2017 | Gupta ................ G06Q 10/1053 |
| 2017/0154337 | A1 | 6/2017 | Wingate-Whyte et al. |
| 2017/0212997 | A1* | 7/2017 | Buonfiglio ............. G16H 70/60 |
| 2019/0164134 | A1 | 5/2019 | Morrow et al. |
| 2019/0304023 | A1* | 10/2019 | Pingali ................... G16H 50/30 |
| 2019/0385126 | A1 | 12/2019 | Morrow et al. |

FOREIGN PATENT DOCUMENTS

| | | | | |
|---|---|---|---|---|
| WO | WO-0133410 A2 * | 5/2001 | ............ | G06Q 30/02 |
| WO | 2019108131 | 6/2019 | | |

OTHER PUBLICATIONS

International Search Report and Written Opinion issued in International Application No. PCT/SG2018/050580 dated Feb. 12, 2019 (previously submitted in related U.S. Appl. No. 15/900,705).
Rawat et al., "Advancement of recommender system based on clickstream data using gradient boosting and random forest classifiers." 2017 8th International Conference on Computing, Communication and Networking Technologies (ICCCNT). IEEE, 2017 (previously submitted in related U.S. Appl. No. 15/900,705).
TailorWell Launches First Online Health Insurance Comparison Tool Targeted Specifically for Unique Needs of Small Businesses in Washington and Oregon, Marketwire, COMTEK News Network, Inc., Nov. 18, 2015 (previously submitted in related U.S. Appl. No. 15/900,705).
Notice of Allowance mailed in related U.S. Appl. No. 16/554,157 dated Apr. 29, 2019 (previously submitted in related U.S. Appl. No. 16/554,157).
Notice of Allowance mailed in related U.S. Appl. No. 16/554,157 dated May 31, 2019 (previously submitted in related U.S. Appl. No. 16/554,157).
Notice of Allowance mailed in related U.S. Appl. No. 16/554,157 dated Jun. 27, 2019 (previously submitted in related U.S. Appl. No. 16/554,157).
Non-Final Office Action issued in U.S. Appl. No. 16/554,157 dated Apr. 27, 2018 (previously submitted in related U.S. Appl. No. 16/554,157).
Final Office Action issued in U.S. Appl. No. 16/554,157 dated Nov. 1, 2018 (previously submitted in related U.S. Appl. No. 16/554,157).
Non-Final Office Action issued in U.S. Appl. No. 16/554,157 dated Oct. 18, 2019 (submitted herewith).
Notice of Allowance mailed in related U.S. Appl. No. 16/554,157 dated Apr. 15, 2020 (submitted herewith).

* cited by examiner

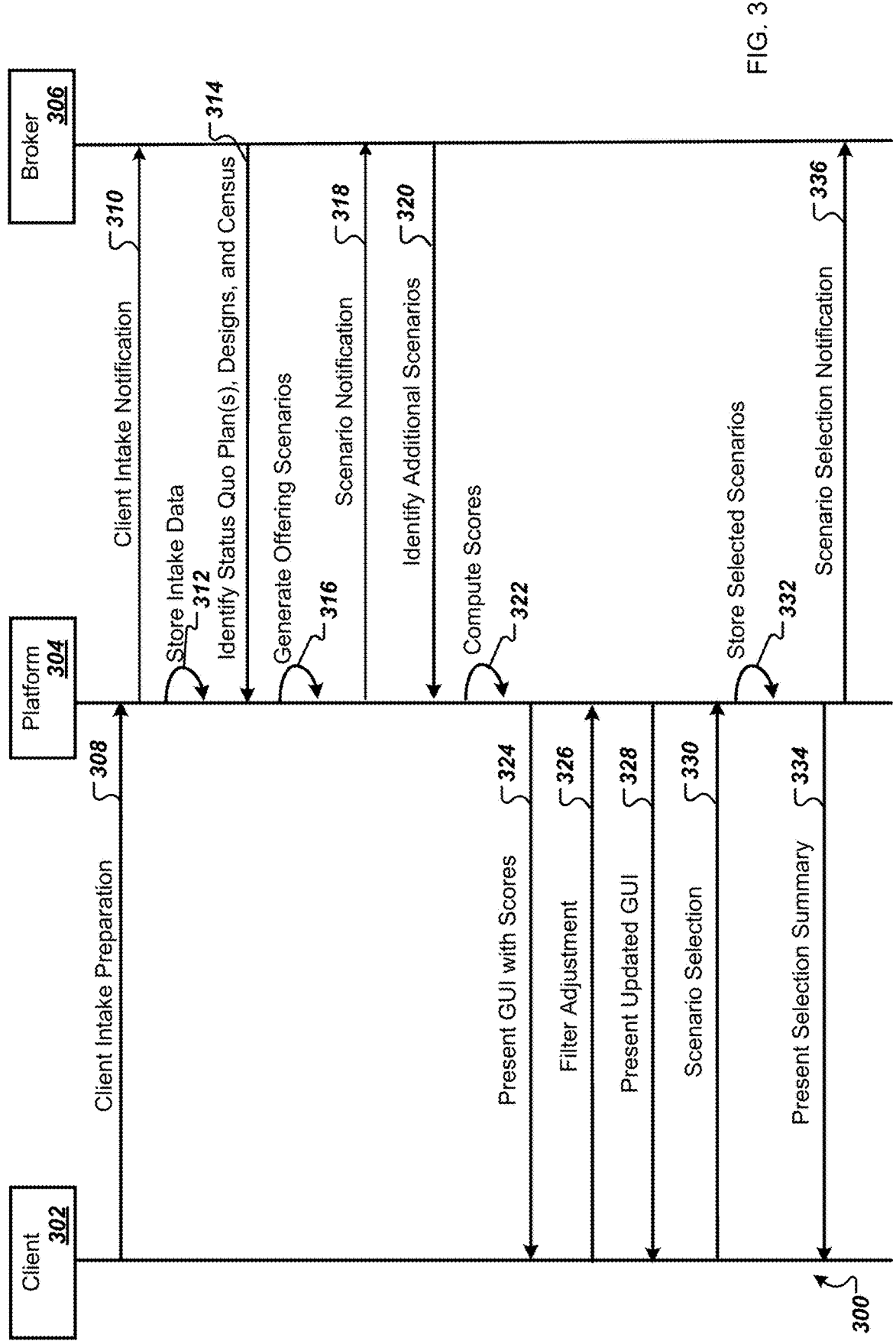

FIG. 4A

GENERAL

ENROLLMENT
Current: 4,500
Projected: 4,700

Industry: [ ]

PLAN RENEWAL DATES
Current: Jan 2017 - Dec 2017
Projected: Jan 2018 - Dec 2018

VOLUNTARY BENEFITS OFFERED
☐ Hospital Indemnity
☐ Critical Illness
☐ Accident

FINANCIAL

| | CURRENT Jan 2017 - Dec 2017 | | PROJECTED Jan 2018 - Dec 2018 | | INCREASE | |
|---|---|---|---|---|---|---|
| | AGGREGATE | PEPY | AGGREGATE | PEPY | AGGREGATE | PEPY |
| TOTAL SPEND | $45,000,000 | $10,000 | $50,055,000 | $10,650 | 11.2% | 6.5% |
| EMPLOYER SPEND | $36,000,000 | $8,000 | $40,044,000 | $8,520 | 11.2% | 6.5% |
| EMPLOYEE SPEND | $9,000,000 | $2,000 | $10,011,000 | $2,130 | 11.2% | 6.5% |

ADD FINANCIAL DETAIL? [NO]
CHOOSE SUBSIDY STRATEGY? [NO]

MARKET COMPETITIVENESS

What best describes your competitiveness strategy?
[Be at compass for group averages]

OPTIMIZATION

GENERAL: [YES] [NO]
*Number of plans, AV, Plan Variety*

PLAN SPECIFICS: [YES] [NO]
*Deductible, OOP, Copays*

EMPLOYEE PERCEPTION

Employee questions regarding medical plans: [10] per [Month]

Check all of the following questions typically heard by employees.
☐ What is a deductible?     ☐ Where can I find the cost of a service/procedure?
☐ What applies to my deductible?
☐ Where can I find the projected cost for my prescriptions?

[SUBMIT]

| Attribute / Plan Name | Silver Super 1500 | Silver 1300 | Gold 1000 |
|---|---|---|---|
| Individual Deductible | $1300 | 975 | $400 |
| Family Deductible | $2600 | $2000 | $800 |
| Individual Out of Pocket Max | $3900 | $3000 | $2000 |
| Family Out of Pocket Max | $7800 | $6000 | $4000 |
| Coinsurance | 20% | 20% | 20% |
| PCP Office Visit | Ded/Coins | $25 | $25 |
| Specialist Office Visit | Ded/Coins | $25 | $25 |
| Emergency Room | Ded/Coins | Ded/Coins | Ded/Coins |
| Urgent Care | Ded/Coins | $25 | $25 |
| Inpatient Hospital | Ded/Coins | Ded/Coins | Ded/Coins |
| Outpatient Surgery | Ded/Coins | Ded/Coins | Ded/Coins |
| Rx - Generic | Ded/Coins | Ded/Coins | $10 |
| Rx - Formulary | Ded/Coins | Ded/Coins | Ded/Coins |
| Rx - Non-Formulary | Ded/Coins | Ded/Coins | Ded/Coins |
| Rx - Speciality | Ded/Coins | Ded/Coins | Ded/Coins |
| Fund Type | None | None | None |
| Speed Amount | $0 | $0 | $0 |
| EE | $30 | $96 | $87 |
| EE + SP | $80 | $226 | $125 |
| EE + Family | $176 | $392 | $222 |
| EE + 1CH | $50 | $144 | $74 |

Waived: 0%   MODIFY   RUN   RESET

Scenario Runs

X  @ $35,695,000
   @ 54;

X  @ $33,695,000
   @ 52;
(1) Silver 1300
*Individual Deductible*
From '$1000' To '975'

SAVE

FIG. 5C

○ Scenario Universe  ▦ Scenario Dashboard  ☑ Interactive Model  ▥ Perceptions Benchmarking

Perception Benchmarking

Benchmarking Cohort

| | |
|---|---|
| Industry: | Manufacturing  — 660a |
| Number of Clients: | 24 — 660b |
| Number of Lives: | 500,000 — 660c |

Plan Attributes

| | 662 Cohort Average | 664 Client XYZ, Inc. |
|---|---|---|
| Number of Plans: | 2.1 | 2 |
| Actuarial Value: | 77% | 80% |
| Contribution PEPY: | | |
| • Single | $1,198 | $1,012 |
| • Family | $2,364 | $2,241 |
| Subsidy %: | | |
| • Single | 82% | 80% |
| • Family | 65% | 70% |
| Percent Opt-Out: | 12.4% | 15% |

Perception Score Distribution

| | |
|---|---|
| Median: | 60 — 666a |
| Client XYZ, Inc. | 65 — 668 |
| 75th Percentile: | 72 — 666b |

Demographics

| | 670 Cohort Average | 672 Client XYZ, Inc. |
|---|---|---|
| Age: | 41 | 39 |
| Percent Female: | 50% | 51% |
| Salary: | $40,000 | $42,000 |

FIG. 6H

OPTIMIZING BENEFITS SELECTION IN VIEW OF BOTH MEMBER POPULATION AND ORGANIZATIONAL PREFERENCES

CROSS-REFERENCE TO RELATED APPLICATIONS

This application is a continuation of and claims priority to U.S. patent application Ser. No. 16/554,157 entitled "Optimizing Benefits Selection In View Of Both Member Population And Organized Preferences" filed Aug. 28, 2019 which is a continuation-in-part of and claims priority to U.S. patent application Ser. No. 15/900,705 entitled "Dashboard Interface, Platform, and Environment for Intelligent Subscription Product Selection" filed Feb. 20, 2018 (now U.S. Pat. No. 10,402,788, issued Sep. 3, 2019) which claims priority to U.S. Provisional Patent Application Ser. No. 62/592,034 entitled "Dashboard Interface, Platform, and Environment for Intelligent Subscription Product Selection" filed Nov. 29, 2017. All above identified applications are hereby incorporated by reference in their entireties.

SUMMARY OF ILLUSTRATIVE EMBODIMENTS

The forgoing general description of the illustrative implementations and the following detailed description thereof are merely exemplary aspects of the teachings of this disclosure, and are not restrictive.

In certain embodiments, an automated system provides for generating subscription product recommendations for clients. The system may include computing systems and devices for receiving a client intake form with product preferences and information regarding member demographics and a current product, and in response, generating product offerings at least a portion of which are variations of the current product. The member demographic information may be consolidated into census divisions that are each associated with a category of the member demographic information, and probabilities of selecting the product offerings are calculated for each of the census divisions. The product offerings may be presented in a first user interface screen with optimization scores that are a function of the probability of selecting the product offerings as well as provider financial goals, employee perception goals, and market competitiveness goals, and in response to receiving weighting adjustments, the optimization scores for the product offerings may be modified. In some embodiments, the system may receive product offering selections at the first user interface screen of the remote computing device, which may be stored in a scenario library and later presented in a second user interface screen at the remote computing device.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 3 illustrates a swim lane diagram of example communication flows;

FIGS. 4A-4B illustrate example graphical user interface (GUI) screens for a client intake form;

FIGS. 5A-5G illustrate example GUI screens that display results of product recommendations;

FIG. 6H illustrates an example GUI screen displaying perception benchmarking information;

DETAILED DESCRIPTION OF ILLUSTRATIVE EMBODIMENTS

Figure 1:
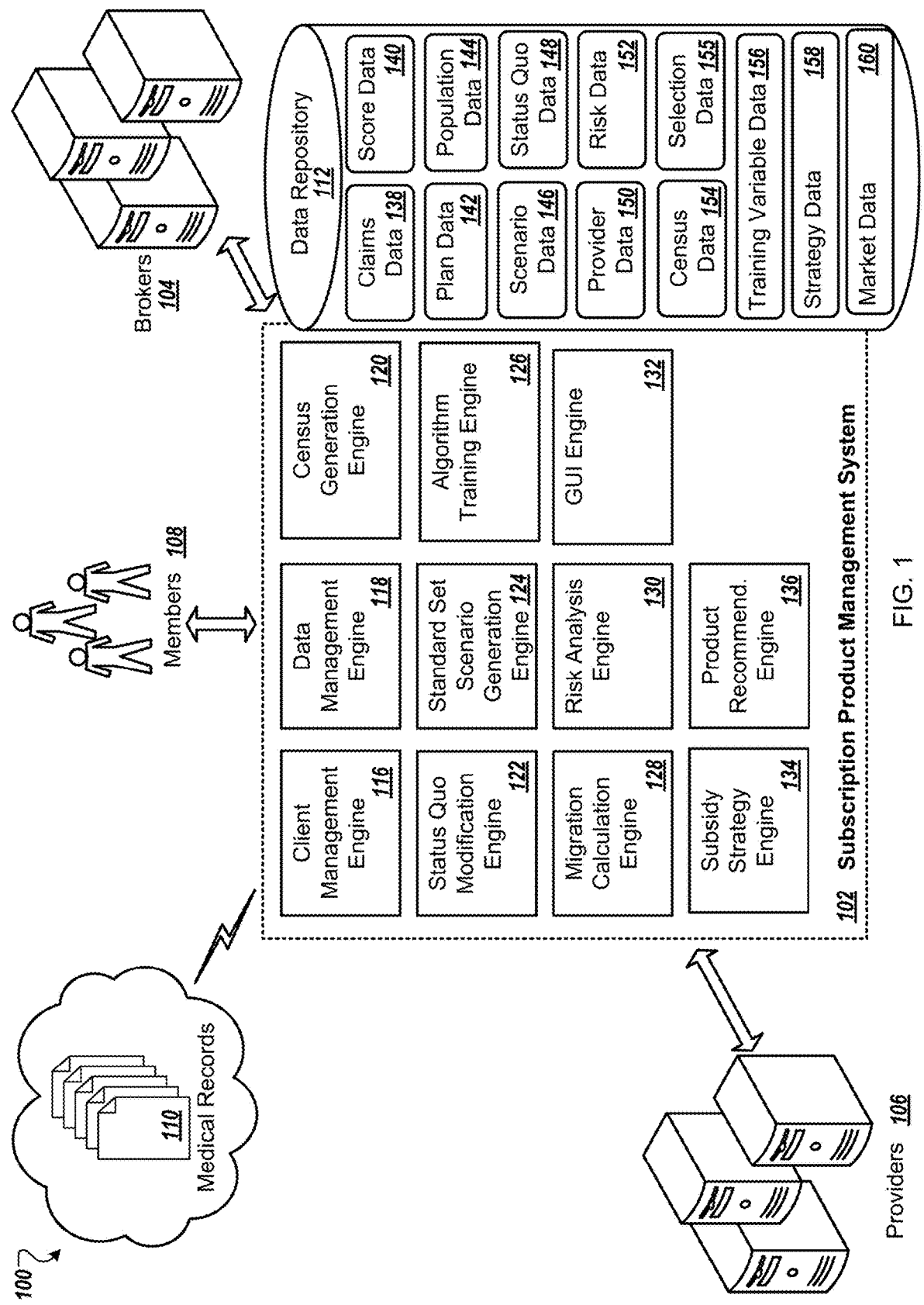
FIG. 1 illustrates an example block diagram of an environment for managing the provision of products between industry participants and individual users.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values there between.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Turning to the figures, FIG. 1 is an example environment 100 for providing customized product offerings and recommendations to clients that includes interactions of participants (providers 106, members 108, and brokers 104) with a subscription product management system 102. In some implementations, the product offerings may include health insurance plans that providers 106 (e.g., employers) offer to members 108 (e.g., employees that work for a company or institution that offers health, pharmacy, and other insurance services as a benefit of employment). The members 108 may be referred to interchangeably as employees throughout the disclosure. In some examples, the recommendations may include all possible product offerings and/or particular offerings that meet specifications and goals of the providers 106. In some aspects, the environment 100 may include a number of provider (e.g., client or employer) computing systems 106, a number of member computing systems 108, and a number of broker computing systems 104 in communication with a network-based system 102 providing a variety of software engines 116 through 136 for supporting a platform for managing and providing subscription products. In some examples, the computing systems for the providers 106, members 108, and brokers 104 may include individual computing devices, servers, and/or organizational computing systems. In addition, the system 102 manages data in a data repository 112 that is generated and/or accessed when performing the processes associated with providing subscription products to clients described further herein.

In some aspects, the broker computing systems 104 may be automated computing systems associated with performing actuarial management and actuarial value functions, which may be integrated into the system 102 in some examples. For example, the broker computing systems 104 may include an actuarial modeling suite (AMS) that allows brokers to interact with the system 102 to input data, select insurance plan offerings, and view scenario results generated by the system 102. In some implementations, the AMS may also manage and maintain census data 154, which is demographic data that provides a summary view of the employees of a respective insurance provider (e.g., employer). For example, the census data 154 may include age, salary, gender, and health risk level for each employee. The AMS may also maintain and provide current insurance market premium (or premium equivalent) rates to the system 102, which may be stored in data repository 112 as market data 160. In some examples, the market data 160 can be used by the system 102 to provide clients with information with how prospective insurance plan offerings compare to insurance plans that are currently offered and provided in the marketplace.

In addition, the broker computing system 104 may also include an actuarial value (AV) model that provides information to the system 102 regarding design elements of the insurance plans, which may include how rich or how lean various insurance plan offerings are. Throughout the disclosure, richer plan offerings refer to those plans with a larger actuarial value (defined as the portion of costs, on average, covered by the plan design) while leaner plan offerings refer to those plans with lower actuarial values. The information provided by the AV model can be stored in the data repository 112 as plan data 142, which may also include the cost information associated with health insurance plans available in the market, and may include premium amounts, employee contributions, employer subsidies, individual and family deductibles, individual and family out-of-pocket maximums, copays, and coinsurance amounts and other plan design elements.

In some examples, a subscription product management system 102 may receive a client intake form from the providers 106 including details related to demographics of employees of a company, status quo (e.g., current) insurance product offerings, financial constraints for product offerings, market competitiveness strategy, and employee perception concerns. In response to receiving the client intake form, the system 102 can provide the clients with customized prospective product offerings based on financial cost to the provider and perceived benefit to the employees. The members 108 may also interact with the system 102 to provide and/or receive information. For example, the members 108 may provide biographical information, medical history information, and/or health insurance preference information that may be stored in data repository 112 for use by the system 102, such as when algorithm training engine 126 trains a machine learning algorithm to accurately compute a probability of an individual member 108 or member demographic category selecting a particular insurance plan that could be offered by the provider 106. This may also be referred to as "migration" from a current insurance plan to another insurance plan from a set of offered plans. In some examples, the prospective product offerings may be presented to the providers 106 in a dynamic graphical user interface (GUI) that may be adjusted in real-time in response to various filtering criteria that may be input by a user (e.g., provider or broker) at the GUI. The system 102, in some embodiments, can generate over a million possible product offering scenarios in real-time that may be presented to a user within the dynamic GUI, some of which may be generated as variations of a current (e.g., status quo) product offered by a provider 106. In some examples, the system 102 provides a technical solution to the technical problem of automating the generation of vast numbers of possibilities of plan scenarios with differing attribute combinations in order to identify the attribute combinations that are most likely to appeal to an employee population.

In some implementations, the system 102 authenticates users connecting through the provider computing systems 106, member computing systems 108, and broker computing systems 104 through a client management engine 116. The client management engine 116, for example, may authenticate users and/or computing systems 104, 106, 108 based upon information stored within provider data 150 and census data 154. In some examples, user passwords, valid computing system addresses, dashboard GUI activity data, etc. may be maintained for individual providers 106 (via provider data 150) and/or members 108 (via population data 144) connecting to the system 102.

When a provider 106 or individual member 108 accesses the system 102, a graphical user interface (GUI) engine 132 may present a client intake form to users (e.g., providers 106) via a series of GUI screens (see FIGS. 4A-4B) that provide a series of user input fields, allowing a client to provide information regarding the status quo plan offerings as well as goals and specifications associated with future product offerings, including, in some examples, plan design, financial, employee perception, and/or market competitiveness goals.

In response to receiving the client intake form and generating product offering scenarios for the client, the GUI engine 132 can also provide scenario data 146 associated with products (e.g., possible insurance plan offerings) available via the subscription product management system 102 along with information regarding how the available product offerings meet the goals and preferences provided in the client intake forms. Through the GUI engine 132, the providers 106 and/or individual members 108 may review product information and select appropriate products (also referred to as scenarios) to meet their needs. In some implementations, the GUI engine 132 may present the product offerings as plotted data points in a graphical format, which may include additional indications (e.g., via colored data points) of optimal product offerings based on the financial, employee perception, and/or market competitiveness goals. For example, each scenario may be plotted as a function of a provider financial score versus an employee perception score that may be calculated based on numerous factors that include member demographic information and provider information. In some examples, the employee perception score and the provider financial score for possible product offering scenarios may be calculated from results of a machine learning algorithm that computes a probability that a member or member demographic category will select a particular product offering based on characteristics of the product. In some examples, the employee perception score reflects which elements of the product offerings are valued by individual members and at what levels. The provider financial score may correspond to a sum product of an amount a provider spends per plan, net of employee contributions, in a projected product offering scenario and the number of projected enrollees per plan based on the computed probabilities of plan selection, which can also be referred to as migration probabilities.

Additionally, the GUI engine 132 may dynamically change the presentation of the product offerings in real-time within a GUI interface screen based on modifications to filter settings and/or product selections made by the providers 106 or members 108. For example, the GUI engine 132 may add or remove product offerings from a GUI screen based on range modifications to the provider financial score, employee perception score, employee perception benchmarking score (e.g., market competitiveness in employee satisfaction score), industry benchmarking score (e.g., market competitiveness score), individual and/or family deductible amounts, individual and/or family out of pocket maximums, number of plans within a product offering, individual and/or family employee contributions, plan funding type, inclusion and level of plan copays, or type of individual plans (e.g., PPO, HMO, HDHP). In some examples, the GUI engine 132 may also dynamically adjust a color or appearance of the plotted data points for product offerings in response to selection of the product offerings by a user, such as a provider 106 or member 108. For example, when a data point is selected in GUI screen 500 (FIG. 5A) the GUI engine 132 may modify the color of the data point.

In some implementations, the subscription product management system 102 also includes a data management engine 118 that organizes data received by the subscriber-provider matching system 108 (e.g., population data 144, status quo data 148, provider data 150, and selection data 155) and also controls data handling during execution of the processes associated with generating product offering scenarios for clients (e.g., providers 106), calculating provider financial scores, employee perception scores and market competitiveness scores for each of the product offerings, and managing product selections made by the clients. In addition, the data management engine 118 may perform a data validation/normalization process to configure the received data into a predetermined format compatible with a format of the files within the data repository 112. For example, the data management engine 118 processes updated client information received from the providers 106 provided in the client intake form and configures the received data into a format that corresponds to the provider data 150 stored in the data repository 112.

The data management engine 118 also controls the interaction of the subscription product management system 102 with one or more data repositories associated with the environment 100. For example, in response to the generation of a categorized member profile (also referred to as a census) for a particular provider 106 by census generation engine 120, the data management engine 118 may automatically store the generated census as census data 154 for the provider within the data repository 112. The data management engine 118 can also access any of the data from the data repository 112 for use by any of the engines of the subscription product management system 102. For example, the data repository 112 data may include population data 144 that includes large numbers of member demographic information for multiple providers that may be used by algorithm training engine 126 to train a machine learning algorithm, such as a gradient boosting machine, that is used to calculate a probability that a particular member may select a particular product offering scenario. In some examples, the population data 144 may also include survey data received from members 108 about characteristics of product offerings that are valued by members 108 and at what levels. The survey data, for example, may be collected after selection of subscription product options by the members 108 to determine member satisfaction with various aspects of the subscription options.

In some implementations, the system 102 includes a number of processing engines that generate possible product offering scenarios to provide to a provider 106, which may include a status quo modification engine 122, a standard set scenario generation engine 124, and a subsidy strategy engine 134. In some aspects, a product offering scenario includes one or more health insurance plans that may be offered to employees of a company. The product offering scenarios may offer varied numbers of plans, amounts of deductibles, premiums, coverage amounts and types, employee contributions, and provider subsidies. The product offering scenarios generated for a particular provider 106 are stored in the data repository 112 as scenario data 146. In some examples, the system 102 evaluates the product offering scenarios generated by the status quo modification engine 122, a standard set scenario generation engine 124, and a subsidy strategy engine 134 to determine in real-time a probability that a given member will migrate from a current insurance plan to one of the plans within a product offering scenario. The probability of migration can be further used to calculate estimated employee perception scores and estimated aggregate provider financial costs for each of the generated product offering scenarios.

In some embodiments, a status quo modification engine 122 generates product offering scenarios that are variations of a current product offered by a provider 106 to employees of a company, which may be referred to as a "status quo" product and may be stored in the data repository 112 as status quo data 148. In some examples, status quo product offering information may be input by a client (e.g., provider 106) at a client intake form the GUI engine 132 or may be accessed from the data repository 112. In some implementations, the modifications to the status quo product offering may be determined based on one or more random numbers generated by the status quo modification engine 122 as well as a number of other factors. For example, the status quo may modify the number of plans offered within a product offering scenario based on a random modification variable "R" between 0 and 1 that indicates whether to eliminate plans, add plans, or only modify the plans from the status quo. Table 1 below provides a set of exemplary criteria for eliminating, adding, or modifying plans based on the value of the modification variable "R." Because the number of possible product offering scenarios is so large, inserting randomness into the scenario modification eliminates the need to choose among similar types of scenarios while ensuring with a high probability that all types of scenario combinations are represented.

TABLE 1

| R | Action | Limitations |
|---|---|---|
| 0 <= r < 0.2 | Eliminate Plan(s) | Number of Plans > 1 |
| 0.2 <= r < 0.4 | Add Plan(s) | N/A |
| 0.4 <= r <= 1 | Modify Plans Only | N/A |

In some implementations, the status quo modification engine 122 modifies the product offerings from a provider's status quo product by adjusting individual and family deductibles, out-of-pocket maximum, and/or coinsurance percentages while maintaining and/or holding constant a status quo relationship between the individual deductible and the out-of-pocket maximum within a plan tier. Similarly, the status quo modification engine 122 may adjust the relationship between a plan's individual deductible and family deductible. In one example, the deductibles, out-of-pocket maximums, and coinsurance levels (e.g., percentages) are all adjusted within a predetermined threshold amount and by a predefined increment. In addition, the status quo product can by modified by altering co-pay amounts for non-HSA-compliant plans that have an assigned modification variable "R" within a predetermined range. In some implementations, the copay amounts for various services such as primary care physician office visits (PCP), specialist office visits, urgent care visits, emergency room stays, inpatient stays, outpatient surgery, and pharmacy services are selected from predefined sets of co-pay amounts that are stored as part of the plan data 142 in the data repository 112.

In some examples, when the modification variable "R" indicates plan elimination, the status quo modification engine 122 can identify a random number of plans to remove such that the number of plans for a product offering scenario is between one and an upper threshold. Similarly, when the modification variable "R" indicates plan addition, the status quo modification engine 122 can identify a random number of plans to add to a product offering scenario such that the number of plans is between one and the upper threshold. In one example, the upper threshold for the number of plans that can be included in a product offering scenario is the larger of five and the number of plans currently offered by provider 106. Additionally, when plans are added to the product offering, the status quo modification engine 122 may generate a plan level random variable that, in conjunction with the modification variable, indicates whether to add plans that are rich, lean, or somewhere in between (middle). Plans that are rich have a larger actuarial value (defined as the portion of costs, on average, covered by the plan design) while plans that are lean have lower actuarial values. In some examples, the values for the individual and family deductibles, individual and family out-of-pocket maximums, and coinsurance for the added plans may be determined based on the values for rich, lean, or middle plans that are stored in the data repository 112 as plan data 142.

In some implementations, a standard set scenario generation engine 124 generates product offering scenarios from a standard set of individual deductible combinations for different numbers of plans that are stored as part of the plan data 142 in the data repository 112. Additional plan attributes and corresponding payment amounts (e.g., family deductible, out-of-pocket maximums, coinsurance, office visits, urgent care, hospitalizations, pharmacy, and health savings fund parameters) for the standard set plans may be generated by random selection from a predefined list based on random variable generation or as a relationship to other attributes. In one example, health savings fund parameters may be determined based on the individual deductible amount. For example, if the deductible is less than a threshold amount, such as $500, then no fund is assumed. If the individual deductible is less than $1500, then the plan may include a health reimbursement arrangement (HRA), and the standard set scenario generation engine 124 may generate a HRA random variable indicating a seed amount for the HRA. If the individual deductible at least $1500, then the plan may include a health savings account (HSA), and the standard set scenario generation engine 124 may generate an HSA random variable indicating a seed amount for the HSA. If a plan is assigned an HSA, then another random variable is used to determine whether to apply copays for the HSA to the plan.

In one example where the standard set of individual deductible combinations includes combinations with one to five plans, 2,111 distinct plan combinations may be generated. For example, the number of plan offering scenarios that each combination of individual deductibles creates may be dependent upon the number of plans in the scenario (e.g., 1 plan generates 8 scenarios, 2 plans generate 30 scenarios, 3 plans generate 40 scenarios, 4 and 5 plans each generate 25 scenarios).

In some implementations, a subsidy strategy engine 134 generates additional scenarios from the plan designs generated by the status quo modification engine 122 and the standard set generation engine 124 by varying cost sharing strategies between providers and members. In one example, the combination of status quo modification engine 122, standard set generation engine 124, and subsidy strategy engine 134 generates over a million product offering scenarios. In some examples, the subsidy strategy engine 134 identifies relationships between a base set of contribution rates and other subgroups. For each of the subgroups within a member population, the subsidy strategy engine 134 defines a relationship between the subgroup and the base subgroup. For example, the relationships may be defined as additive, multiplicative, or none (no defined association).

The subsidy strategy engine 134 applies the cost sharing strategies to each of the base subgroups, and the appropriate adjustments are applied to the other subgroups based on the defined relationships. In some aspects, computational algorithms associated with each of the strategies may be stored in the data repository 112 as strategy data 158. In some examples, for each strategy, the strategy data 158 may include computations for defined relationships only, as well as for scenarios with no defined association to the base subgroup.

In some examples, the cost sharing strategies can be classified as either percent of premium strategies or fixed dollar strategies. Additionally, other strategies can be generated by a user, such as the providers 106 or brokers 104 in real-time using a manual design user interface.

In some implementations, percent of premium strategies define employee contributions to be a percentage multiplied by a premium equivalent rate. Premium equivalent may be defined as the estimated monthly amount that would be charged to a client (e.g., provider 106) if a medical/pharmacy insurance program was fully insured. In one example, the percentage premium calculation is performed prior to calculation of member selection probabilities since the selection probability is based on the employee contribution level. Adjustments may be made to the premium equivalent rates once the member selection probabilities are calculated by the migration calculation engine 128 to reflect assumed selections and to preserve the contributions. For example, premium rates may change based on the number of members that select each of the offered plans within a product offering scenario. Once the selection probabilities are calculated, any adjustments to the premium rates may be applied to the product offering scenarios. The percentage of premium strategies may include status quo, straight percent of premium, percent of premium by tier, percent premium by plan, or lean consumer driven health plan (CDHP).

If the number of plans in a given scenario corresponds to the number of plans in the status quo scenario, then a status quo strategy may be applied. In some aspects, the status quo strategy preserves all contribution to premium relationships from the status quo plan offering. For example, each plan in a base scenario for a subgroup may be mapped to a plan in the status quo scenario such that the contribution to premium relationships are the same between the status quo scenario and the base scenario. The result for the premium contributions for the base scenario may then applied to other scenarios within the subgroup.

For the straight percent of premium strategy, for each plan and tier, the subsidy strategy engine 134 may generate additional scenarios defined by a percentage of the premium equivalent at predetermined percentage increments. In one example, the percentage increment may be 2.5 percent of premium equivalent. In some implementations, the percent of premium by tier strategy is similar to the straight percent of premium strategy except that the percentage of the premium equivalent is different for a single employee tier than for all other tiers that include the employee plus one or more family members. For the percent of premium by plan strategy, the contributions for every plan and tier are defined by the percentage of the premium equivalent and are different for every plan within the product offering. In one example, the percentage of the premium equivalent increases as the actuarial value for the plan increases, which is referred to as increasing spread. In another example, the percentage of the premium equivalent decreases as the actuarial value for the plan increases, which is referred to as decreasing spread. Additional percent of premium by tier and by plan product offering scenarios can be generated at predetermined increments of the percent of premium.

For the lean CDHP percent of premium strategy, the contribution of every plan and tier is defined by a percentage of the premium equivalent, but the leanest CDHP is subsidized at a higher rate for the employee than for other health plans. In one example, the lean CDHP can be defined as the lowest plan where the individual deductible is at least $1,400, the minimum individual deductible differential between the lowest plan and the next leanest plan is $1,000, and the minimum actuarial value differential between the lowest plan and the next leanest plan is 10%. Additional lean CDHP product offering scenarios can be generated at predetermined increments of the percent of premium.

In addition to the percentage of premium strategies for generating additional product offering scenarios, the subsidy strategy engine 134 may also apply fixed dollar strategies to the base scenarios of the subgroups to generate additional product offering scenarios. For a fixed contribution by tier ratio strategy, the employee-only subsidy (amount paid by provider) can be defined by a fixed dollar and is consistent among each plan in the product offering but the subsidy ratios can vary between tiers. For a fixed by tier strategy, predetermined tier ratios may be applied and are defined by the leanest plan in the product offering. For a fixed by tier, set by tier strategy, the dollar amounts and tier ratios may be fixed, and the employer subsidy amounts for each tier correspond to a multiple of a predetermined dollar amount.

A risk analysis engine 130, in some implementations, develops risk data 152 used to determine aggregated risk associated with each member 108. In some implementations, the risk data 152 is based upon demographic data 144 (e.g., geographic region, age range, gender, etc.). In one example, the risk analysis engine 130 may analyze claims data 138 accessed from the data repository 112 to anticipate future costs based upon past costs. The claims data 138, for example, may be provided by the members 108 or from industry participants (e.g., insurance companies) via the brokers 104. The risk analysis engine 130, for example, may review the demographic data 144, which may include a member population associated with a particular provider or total population data for some or all providers that interact with the system 102 as well as, optionally, medical diagnosis information provided by the members 108 and/or collected from individual user medical records 110 (e.g., accessible from a cloud server or other secure storage location). In some implementations, based on the analysis of the demographic data 144 and/or claims data 138 and health and lifestyle characteristics of individuals, the risk analysis engine 130 may calculate a risk score for each of the members 108 that reflects a relative amount of insurance risk associated with a particular member and is stored in the data repository 112 as risk data 152.

The subscription product management system 102 may also include a census generation engine 120 that creates a profile summary, referred to as a census, of the member 108 of a particular provider 106 by grouping the members 108 into categorized divisions that reflect demographic features of the members 108 as well as features of the current insurance plans held by the members 108. For example, the demographic categories may include salary, risk score, current plan, projected plan, coverage tier, dependent count, plan subgroup, age, gender, spousal employment, income, and/or smoker status. Additionally, each category may include multiple divisions to which members are assigned. For example, the salary category may include five, ten, fifteen, or more divisions that each reflect salary ranges between $0 and more than $150,000. Similarly, a risk score category may include divisions that each reflect a particular range of risk scores. In some implementations, the census generation engine 120 assigns each member 108 to a division within each demographic category, and the member counts within each of the divisions are saved as census data 154 for a particular provider 106 within the data repository 112.

By condensing the demographic information for the members 108 of a particular provider 106 to a census profile summary that includes numbers of individuals within category divisions, the system 102 can impose a cap on the number of independent census category divisions for a provider 106 regardless of total number of members 108, which standardizes how census data 154 is processed by the system 102 and reduces the amount of data handled by the system 102, thus improving processing speed. Processing the census data 154 rather than processing information for individual members 108 may also reduce the need for a provider 106 to have a minimum number of members in order to use the system 102 since the data size of the census data 154 for different companies is the same regardless of number of members 108. In some examples, generating customized census divisions for each client enables the system 102 to more accurately calculate selection probabilities for each of the divisions that are not subject to human biases that exist in manual employee benefit selection.

The subscription product management system 102 may also include an algorithm training engine 126 that trains the machine learning algorithm that performs product migration calculations, which includes computing the migration probabilities that members within each of the census category divisions will "migrate" from a current insurance plan to a plan in a particular product offering scenario as well as calculate employee perception scores for each of the product offering scenarios. In some examples, the machine learning algorithm is a gradient boosting machine (GBM), which is a tree-based model that uses sets of customized training variables that reflect the census data 154 for the provider as well as the scenario data 146 generated by the scenario generation processing engines 122, 124, and 134. Other types of machine learning algorithms can also be used to include logistic regression, K-nearest neighbors (KNN), one class support vector machine (SVM), or other tree-based models such as a decision tree or random forest (RF). In some examples, generating the customized sets of training variables to train the machine learning algorithm enables the system 102 to provide a technical solution to the technical problem of ensuring the machine learning algorithm is trained with unbiased information regarding an individual or employee population. This customization of training variable sets provides a technical improvement over manual employee benefit selections that may be made subject to biased information regarding individual and employee populations.

In some examples, the algorithm training engine 126 applies weighting factors to the input variables to reflect a relative importance of each of the variables, which may vary between providers 106. In one example, the input variables may include the risk score division assignment, plan similarity (a score of how close a projected plan is to the current plan in terms of design elements such as deductible and copay), max similarity (an indicator as to whether a particular plan is the closest plan similarity of all the plans in a product offering scenario), plan richness (percent difference in contribution per AV of projected and current plans), delta contribution (difference in contribution of projected and current plans), delta salary deductible (difference of projected plan deductible and salary as a percentage of salary), and/or delta salary contribution (difference of projected plan contribution and salary as a percentage of salary).

In some implementations, the input variables for the machine learning algorithm can be trained with population data 144 that includes large numbers of member demographic information for multiple providers as well as survey data received from members 108 about characteristics of product offerings that are valued by members 108 and at what levels. In some examples, the number of trees used in the GBM algorithm may also be determined by the algorithm training engine 126 during training. Additionally, the training of the machine learning algorithm may occur in real-time or may be performed in an off-line environment.

In some implementations, the population data 144 is enhanced with survey data obtained after migration to new plans. The survey data, for example, may capture actual employee satisfaction with the new plan structure in place (as well as actual employee migration to individual plans within the plan structure). In this manner, the machine learning algorithm may learn to anticipate employee satisfaction.

The system 102, in some implementations, includes a product migration calculation engine 128, which calculates probabilities that the members 108 associated with each census category division will migrate from a current insurance plan to a newly offered insurance plan within a particular scenario. In some implementations, prior to applying the machine learning algorithm, the migration calculation engine 128 performs a "waived" uptake determination to determine the probability that a member who waived insurance coverage in the current year will waive coverage in the upcoming year based on the offered product scenarios. The waived uptake probability, for example, may be calculated as a probability of reentering the insurance pool based on the ratio of the cheapest plan's contribution to the member's salary. Additionally, prior to applying the machine learning algorithm, the migration calculation engine 128 may remove from consideration any scenarios that fall outside individual rate limits or client cost constraints. Migration probabilities are adjusted based on observations of previous migration implementations.

In some implementations, the migration calculation engine 128 applies the census data 154 for a provider 106 to the trained machine learning algorithm with a convolution operation. In some examples where a GBM algorithm is used, the migration calculation engine 128 performs GBM scoring to compute, for each division in the census, migration probabilities for each of the plans in the generated product offering scenarios as well as for waived coverage status. In some aspects, the output of the GBM scoring results includes each census division paired with all of the projected plans with a corresponding probability of selecting the plan, which is also referred to as the migration probability. In some embodiments, the migration probabilities can be multiplied by a bias correcting parameter to account for the lack of an explicit "waive coverage" category in the GBM training data. For example, for each census division, a total selection probability can be calculated as:

$$\text{Total Selection Probability} = \Sigma \text{Prob Selecting Plan}_i \qquad (1)$$

A total selection probability of greater than or equal to one implies that there is no probability of the census division waiving coverage and that the division will select the designated plan. If the total selection probability is greater than or equal to one, the following normalization calculation for the individual plan probability may be performed:

$$\text{Probability Selecting } Plan'_i = \frac{\text{Probability Selecting } Plan_i}{\text{Total Selection Probability}} \quad (2)$$

If the total selection probability is less than one, then, in some embodiments, the individual plan probabilities are not normalized, and there is a probability of waiving coverage as illustrated by the equation below:

$$\text{Probability of Waive} = 1 - \text{Total Selection Probability} \quad (3)$$

In some embodiments, an additional calculation of a probability of waiving coverage is performed in instances where insurance rate hikes of more than a predetermined amount occur outside of the machine learning algorithm. For example, if the number of members predicted to select one or more plans results in an increase in premium rates, then the selection probabilities and probabilities of waiving coverage may be recalculated to reflect the rate adjustments. Additionally, the migration probability results may be presented in a GUI screen that allows users to manually override the migration results based on experiential knowledge.

In some implementations, the migration calculation engine 128 may apply other scoring methodologies for calculation of the migration probability, and combinations of multiple migration models may be used to generate the migration results. In one example, the migration calculation engine 128 may execute a two-step algorithm where a first migration scoring model is applied to the product offering scenarios, and based on the results, a second scoring algorithm is applied to one or more of the product offering scenarios if certain conditions associated with the first scoring algorithm are met.

In some implementations, the migration calculation engine 128 may apply an inertia model to the one or more plans that are most similar to the current plan to determine a likelihood that a member selects one of the most similar plans. A secondary model, referred to as a free choice model, may be applied in combination with the inertia model to the remaining less similar plans to determine the probability that the member makes a "free choice" to select any plan that is part of the scenario offering. In some implementations, using combinations of migration scoring models may improve current data fitting while simultaneously reacting correctly to pricing scenarios outside the range of trained data. In some examples, the flexibility and range of both system-generated and user-defined product offering scenarios may greatly exceed the scenarios currently offered in the market that are typically seen by clients. The combined migration model provides for accurate scoring selection probability calculation for plans that are similar to those that are typically seen by clients as well as plans having designs that are not typically available in client offerings. For example, using the combined migration model, the migration calculation engine 128 may be able to calculate accurate selection probabilities for a user-defined scenario may include a plan with a higher actuarial value (richer) that is priced lower than a plan with a lower actuarial value (leaner), which may rarely occur in client offerings. In some implementation, the inertia model may be used to provide a fit for client data when the product offering scenarios are similar to the status quo product offering scenarios while the free choice model provides a fit for client data when the product offering scenarios include plans with new designs that are not as similar to the status quo scenarios. In addition to the applied models, the migration calculation engine 128 may also apply a deterministic set of logic to determine a probability that a member will waive coverage based on changes in price versus current price, adjusted for salary and risk profile.

Once the probabilities of selection are calculated for each census division with each possible plan associated with the projected scenarios, the member counts within each of the divisions can be distributed across the plan options for the projected scenarios according to the probabilities. For example, Table 2 below illustrates the probabilities of selection and corresponding member counts of three projected plans (A, B, C) as well as waived coverage for a particular salary, age, and risk score divisions.

TABLE 2

| Salary Division | Age Division | Risk Score Division | Current Plan | Projected Plan | Members in Division | Prob. of Selection | Post Migration Counts |
|---|---|---|---|---|---|---|---|
| 1 | 2 | 0 | PPO Low | A | 1000 | 0.2 | 200 |
| 1 | 2 | 0 | PPO Low | B | 1000 | 0.7 | 700 |
| 1 | 2 | 0 | PPO Low | C | 1000 | 0.05 | 50 |
| 1 | 2 | 0 | PPO Low | Waive | 1000 | 0.05 | 50 |

In some implementations, the system 102 also includes a product recommendation engine 136 that, based on the selection probabilities for each of the plans calculated by the migration engine 128, determines optimal product offering scenarios to present to the client based on the financial, member, and market competitiveness goals provided by the client (e.g., as indicated on the client intake form). In some examples, the product recommendation engine 136 calculates a provider financial score, an employee perception score, and a market competitive score for each of the product offering scenarios. For example, the provider financial score may correspond to the sum product of the provider spend per plan in the projected scenario and the number of enrollees per plan.

Calculation of the employee perception score may be based on the employee perception information provided in the client intake form (e.g., employee perception section 410 in FIG. 4A), which may include the number of medical insurance plans the provider receives per month as well as the types of questions that are asked. The employee perception score may also be calculated based on survey data received from members 108, which may or may not be the same as the client population. The survey data may include characteristics of product offerings that are valued by members 108 as well as metrics that include the percentage of members who opt out of selecting a plan without having other coverage, the employee contribution as a percentage of the premium, and the percentage of members who choose a plan other than the cheapest plan. Calculation of the market competitiveness score may be based on how the features of the plans included in the product offering scenarios compare to the types of health insurance products offered in the market or may be based on data related to the offerings of other providers, which may be limited to providers of a similar size or in a similar industry. The plan design features may include number of plans offered, whether an HMO is offered, whether an HSA-compliant plan is offered (and individual seed amount), whether an HRA is offered, the lowest cost plan for an individual, average actuarial value, average employer subsidy, and whether the plans offer coverage for critical illness, hospital indemnity, or accident. Additionally, the product recommendation engine 136 may process all of the generated product offering scenarios and discard any scenarios having a financial score, an employee perception score, or a market competitiveness score that falls outside of the client preferences (e.g., as provided in the client intake form).

At least a portion of the transactions described above in relation to the subscription product management system 102 can be performed in real-time, while other transactions may be performed in an offline or batch mode operation. For example, the training of the machine learning algorithm may be performed in an offline environment.

In some implementations, the communications between the system 102 and one or more of the brokers 104, providers 106 and individual members 108 are encrypted or otherwise secured. The subscription product management system 102, in some implementations, performs verification of one or more of the brokers 104, providers 106 and/or individual members 108. For example, the system 102 may verify that a particular individual member 108 is an eligible member of a particular provider 106. Additionally, the system 102 may verify that a broker 104 has permission to access data for a particular provider 106.

Figure 2:
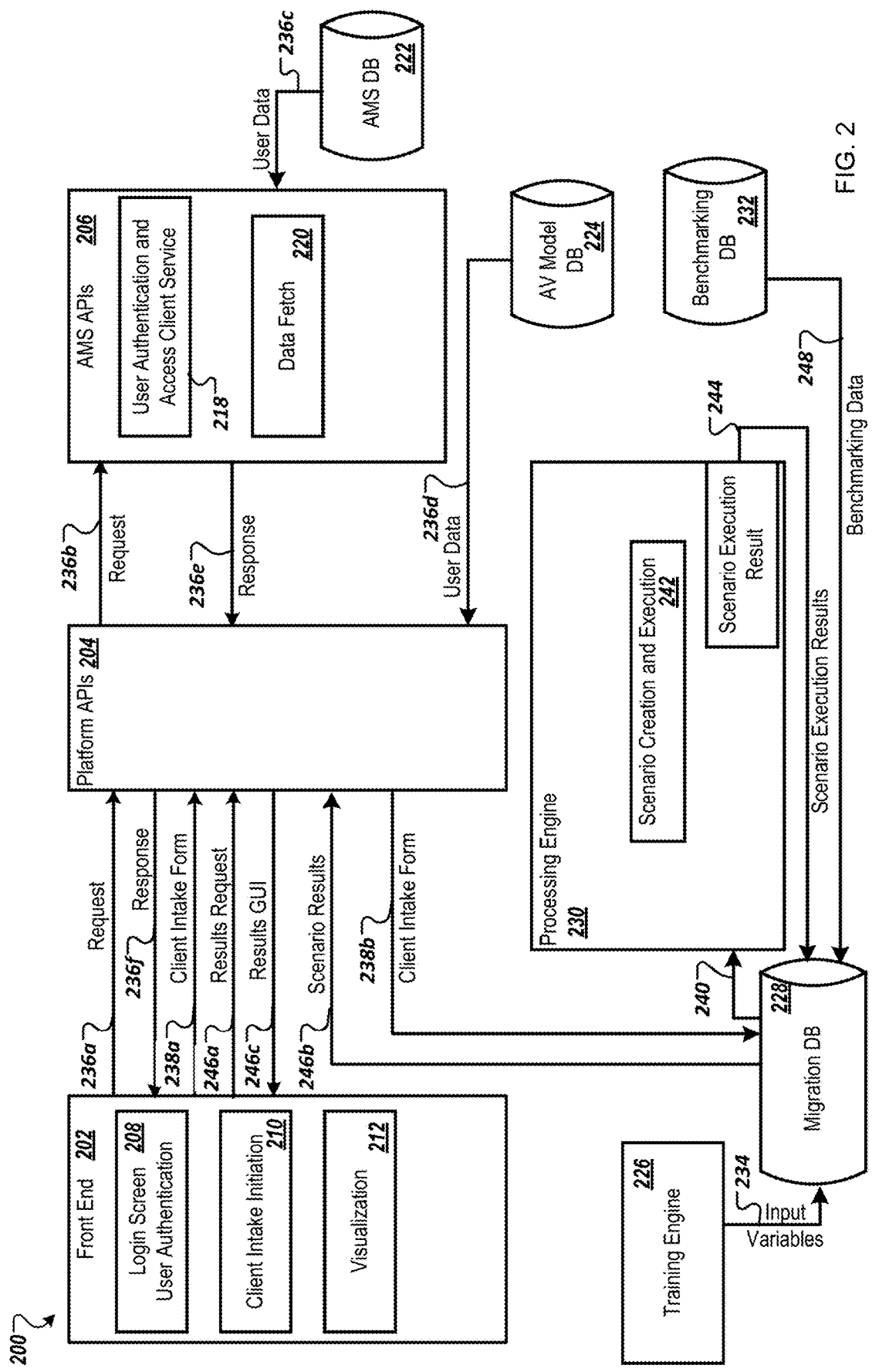
FIG. 2 illustrates an example block diagram of a subscription product management system architecture.

Turning to FIG. 2, an example block diagram of a subscription product management system architecture 200 is illustrated, which may be an exemplary system architecture for the subscription product management system 102 (FIG. 1). In addition to computing system components, the architecture 200 also illustrates data flows between the computing system components. In some implementations, the system architecture 200 includes computing systems for a front end 202, which presents various types of GUI screens to users accessing the system to input and/or receive information, such as the providers 106, members 108, and brokers 104 of FIG. 1. In some examples, the front end 202 may cause presentation of the GUI screens via a web portal interface. For example, the front end 202 may include a login screen 208 that allows users to be authenticated in order to access the system. In some examples, user passwords, valid computing system addresses, dashboard GUI activity data, etc. may be maintained by the front end 202 for individual providers 106 and/or members 108 connecting to the system 102. The front end 202 may also present GUI screens that allow users to initiate and complete client intake forms 210. Receipt of a completed client intake form by the front end 202, in some embodiments, triggers commencement of the processes associated with identifying, for clients, possible product offering scenarios and providing recommendations to clients regarding which insurance products to offer their members. In some implementations, the front end 202 also provides visualization GUI screens 212 that allow clients to view results regarding which insurance product offerings best meet their needs with respect to provider financials, employee perception, and market competitiveness.

In some implementations, the front end 202 interfaces with back end computing systems via platform application program interfaces (APIs) 204. For example, the APIs 204 can interface with an actuarial value (AV) model database 224 to access and/or store product offering plan designs. The APIs 204 may also interface with actuarial modeling suite (AMS) APIs 206 that manage and maintain census data, client lists, and insurance market premium (or premium equivalent) rates within an AMS database 222. In some implementations, the AMS APIs 206 may include a user authentication API 218 that may authenticate brokers or other individuals to access client information. A data fetch API 220 may provide for coordination of accessing data from the AMS database 222 that may be used by the processing engine 230 when generating product offering recommendations for a client.

In some examples, training engine 226 and processing engine 230 function to perform many of the processing tasks performed by the processing engines of the subscription product management system 102 described above (FIG. 1). For example, the processing engine 230 may execute software processes similar to the status quo modification engine 122, standard set scenario generation engine 124, and subsidy strategy engine 134 of FIG. 1 in order to generate product offering scenarios for a client (242). In addition, the processing engine 230 may also perform processes similar to the census generation engine 120, migration calculation engine 128, and product recommendation engine 136 of FIG. 1 to determine probabilities that members will migrate from a status quo insurance plan to an insurance plan that is part of a product offering scenario. Training engine 226 may execute processes similar to those of the algorithm training engine 126 of FIG. 1 to train a machine learning algorithm with a customized set of input variables (234). The processing engine 230 may also calculate provider financial scores, employee perception scores, and market competitiveness scores for each of the product offering scenarios to identify optimized scenarios for a client based on client priorities (e.g., as indicated in the client intake form). Additionally, the training engine 226 and processing engine 230 may operate in real-time and/or offline from the front end 202, APIs 204, and AMS APIs 206. In some embodiments, data associated with generating the product offering scenarios and calculating financial, employee perception, and market competitiveness scores for each of the scenarios is stored within migration database 228. For example, the migration database 228 may store input variable data and other data associated with training the machine learning algorithm from the training engine 226 (234), scenario execution results from the processing engine 230 (244), industry benchmarking data from a benchmarking database 232 (248) that may be updated periodically (e.g., quarterly, upon addition of a new organization's data, etc.) to track industry standards for product offering scenarios, perception benchmarking data from the benchmarking database 232 (248) to track employee perception standards (e.g., regionally, within a particular industry, by employer size, etc.), and/or client intake submissions (238b). The perception benchmarking data, for example, may include both data representing employee preferences in selecting products as well as survey results data representing employees' actual satisfaction in using the selected product.

In one example, data flow 236 illustrates interactions of the computing system components for a request made at the front end 202 and corresponding responses from the APIs 204, 206. In some aspects, the request from a user at the front end 202 may include user authentication, population of data at the front end (e.g., census and plan data provided in the client intake form) (236a, 236b), which may result in retrieval of user data from AMS database 222 (236c) and/or AV model database 224 (236d) to populate the client intake form. In response to receiving the request, the APIs 204, 206 may provide a response for the requested authentication or data (236e, 236f).

Once the client intake form has been completed at the front end 202, the user may submit the client intake form (238a), which may be received by the platform APIs 204 and transmitted to the migration database 228 (238b). In response to receiving the submitted client intake form, the submission is transmitted from the migration database 228 to the processing engine 230 (240), which triggers the processing engine 230 to generate the product offering scenarios, perform migration calculations, and compute perception, financial, and market competitiveness scores (242). In some embodiments, the scenario execution results calculated by the processing engine 230 is stored at the migration database 228. In response to receiving a results request submitted by the providers at the front end 202 (246a), the platform APIs 204 retrieve the results from the migration database 228 (246b), which are transmitted to the front end 202 within a results GUI screen (246c).

Turning to FIG. 3, a flow diagram illustrates communication flows between a client 302 (e.g., provider 106 in FIG. 1), a platform 304, and a broker 306 during an example product recommendation process 300 that illustrates an example of how data is captured, processed, and generated by the platform 304 during client intake, scenario generation, and product recommendation. The recommendation process 300, for example, may be supported by the environment 100 of FIG. 1, where the platform 304 represents the system 102, the client 302 represents the provider computing systems 106, and the broker 306 represents the broker computing systems 104. In some examples, the operations that are illustrated in FIG. 3 as being performed by the broker 306 may instead be performed by the platform 304 as described with respect to the system 102 in FIG. 1.

Figure 4B:
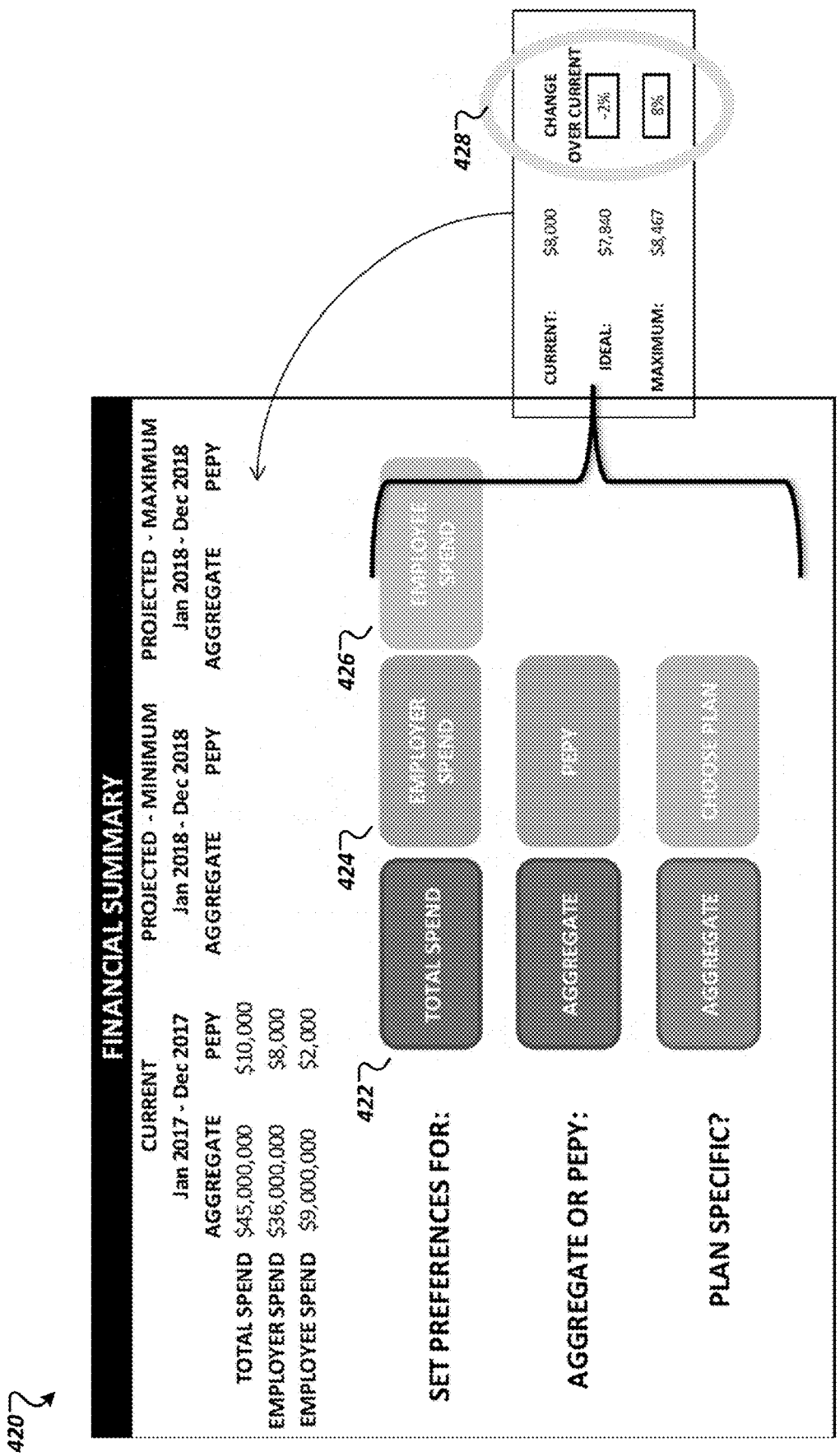

In some implementations, the recommendation process 300 begins with the client 302, such as a provider who offers a health insurance program with one or more insurance plans to members, preparing a client intake form (308). For example, as discussed above, the client 302 may interact with the platform 304 through various user interface screens to provide information regarding member demographics and preferences associated with insurance plan design, provider financial contributions, market competitiveness, and employee perception of the provided insurance plans. FIGS. 4A-4B illustrate exemplary client intake GUI screens where a client, such as a client 302, can provide client intake inputs to the system, which can include a new client intake form or updates to a previously submitted form.

FIG. 4A illustrates an example summary view GUI screen 400 that provides a dashboard view with sections that include general information 402, financial information 404, market competitiveness 406, optimization 408, and employee perception information 410. The general section 402, in some implementations, may provide current and projected enrollment numbers for the client and date ranges for plan years. The general section 402 may also include an industry input field 412 that allows a client to select, such as from a dropdown menu, an industry associated with the provider's organization. In addition, elective benefit offering selectors 414 can allow the client to select additional elective benefit options for the insurance plans, which may include hospital indemnity, critical illness, and accident coverages.

In some embodiments, the financial information section 404 provides an overview of aggregate and per employee per year (PEPY) amounts spent for providers, members, and total for the current and projected years as well as percent increases between years. The financial information section 404 may also provide a subsidy strategy selector input 416 that allows the client to indicate whether he/she would like to choose a subsidy strategy. A financial detail selector 418 may trigger additional GUI screens to be presented to the user that allow financial preference parameters to be provided. For example, FIG. 4B illustrates an example financial detail GUI screen 420 that may be presented to the client in response to selecting "yes" at the financial detail selector 418. In some implementations, the financial detail GUI screen 420 includes inputs for the client to set preferences for amounts of total spend 422, provider spend 424, and member spend 426 on an aggregate or PEPY basis and for all plans or a specific plan. In some examples, the financial detail GUI screen 420 may provide the ability to set ideal and maximum values for inputs 422-426 and may dynamically compute differences between the current and projected years based on the ideal and maximum input amounts, which can be displayed at data field 428.

Returning to FIG. 4A, the market competitiveness information section 406 of the summary view GUI screen 400, in some implementations, also includes a competitiveness strategy input field 430 that enables a client to select, such as from a dropdown menu, how the client would like the offered insurance plans to compare to other insurance plans in the market. An example of a market competitiveness strategy is that the offered insurance plans be within a predetermined threshold of group averages for other plans offered in the market.

In some implementations, the optimization section 408 of the summary view GUI screen 400 includes general and plan-specific optimization preference input selectors. For example, when "yes" at the general preference selector is selected, a general preference detail GUI screen may be presented that provides additional preference selection categories, such as number of plans, actuarial value spread, and plan variety. If the plan variety selection category is selected, for example, a plan variety detail screen may be presented that allows users to select preferred features of the provided insurance plans at inputs for high-deductible health plan (HDHP), HDHP except prescriptions (Rx), HDHP except physicians, Rx and physician copays, mostly copays, and health funds. If the health fund category is selected, another GUI screen may be presented that allows users to make further selections regarding HSAs and/or HRAs.

When "yes" at the plan-specific optimization preference input selector of the optimization section 408 of the summary view GUI screen 400 is selected, a plan-specific detail GUI screen may be presented that may include plan categories, that when selected, open preference selections within a given category. For example, if a copay category is selected, a copay detail screen may be presented that allows users to indicate various types of copay services input copay limits for each of the selected services, which may include pharmacy, physician, emergency room, urgent care, inpatient, and/or outpatient surgery services.

In some implementations, the employee perception information section 410 of the summary view GUI screen 400 may also include member question input fields that allow a client to input how many health insurance-related questions are received from members within a given time period (e.g., week, month, year) as well as make selections about types of questions that are typically asked by members. The number and type of insurance-related questions can be used by the platform 304 (FIG. 3) to identify features of insurance plans that members value most. In some examples, once a minimum threshold of user input fields has been completed within the GUI screens, such as when the inputs associated with the optimization section 408 have been completed, the platform 304 may cause presentation of submission selector 446, which when selected, causes transmission of the client intake form to the platform 304.

In some embodiments, additional client intake GUI screens may be presented by the platform 304 that allow clients 302 to select status quo plans, census data for a provider, and preferred insurance plan designs that are stored at the computing systems for the platform 304 and/or brokers 306 (e.g., AMS and AV model computing systems). For example, a status quo GUI screen may allow users to select a data set and applicable version for the status quo product offering scenario that is currently offered to members. In one example, the status quo GUI screen provides a user with a means to enter a projected total claims amount and a projected expenses amount on a per member per month basis. In another example, the status quo GUI screen allows a user to enter a claims trend rate, an expenses trend rate, and a distribution between the loss ratio and expense ratio to be applied to a current year's premium (or premium equivalent rates). In yet another example, at the status quo GUI screen, the user may choose not to enter any client-specific information, and a system generated trend and assumed distribution may be applied to the current year's premium (or premium equivalent) rates. In some examples, a status quo projection can be performed by the AMS based upon selections made by the user at the status quo GUI screen. Additionally, a census selection GUI screen allows clients 302 (FIG. 3) to select a census data set and version that is applicable to the client 302. In some examples, a plan design GUI screen allows clients 302 to select preferred plan designs from a list of stored plan designs at the AV model computing systems of the brokers 306. In some implementations, the client intake form may include additional GUI screens that allow the client 302 to indicate how the platform 304 treats subgroups. For example, the client 302 may indicate that only base subgroups should be used in the generation of recommendations and other subgroup distinctions may be ignored. Further, the intake form may allow the client 302 to add an aggregate adjustment amount to the generated product offering scenarios.

Returning to FIG. 3, once the client intake form is submitted to the platform (308), in some implementations, the platform 304 transmits a client intake notification to the brokers 306 (310). In some implementations, the client intake notification can include a request for any applicable data for the client 302 indicated in the client intake GUI screens, such as status quo plans, census data, and plan design data. Additionally, the platform 304 may store any information provided by the client 302 at the client intake GUI screens in an associated data repository (312). In response to receiving the client intake notification that includes a request for applicable data for the client 302 from the platform 304, the brokers 306 can return any requested information, which may include status quo plans, census data, and plan design data for the client 302 (314). In some examples where the platform 304 performs functions associated with the AMS and the AV model systems, the platform 304 may retrieve any applicable data from an associated data repository, such as data repository 112 (FIG. 1).

In some implementations, in response to receiving the client intake form and any other status quo data, census data, and plan design data, the platform 304 generates possible product offering scenarios (316) based on the financial, market competitive, and employee perception preferences of the client 302 as described above with respect to the status quo modification engine 122 and the standard set generation engine 124 of the system 102 (FIG. 1) and transmits a scenario generation notification to the broker 306 that includes scenario data for the generated scenarios (318). In response to receiving the scenario generation notification, the brokers 306 may generate additional scenarios as described above with respect to the subsidy strategy engine 134, status quo modification engine 122, and standard set generation engine 124 of the system 102 (FIG. 1) and transmit the additional scenarios to the platform (320). In one example, the platform 304 may perform the additional scenario generation without notifying the brokers 306. In some examples, the platform 304 computes provider financial costs a market competitiveness score, and an aggregate employee perception score for each of the generated product offering scenarios (322) in order to identify the scenarios that fall within the preferences of the client 302 as well as scenarios that best meet the client's preferences.

In some implementations, the platform 304 causes presentation of one or more dynamically adjustable GUI screens to the client 302 that include the financial, market competitiveness, and employee perception scores for the generated product offering scenarios (324) along with indications of the optimal scenarios that best fit the goals and preferences of the client. In some implementations, the platform 304 may present the product offering scenarios as plotted data points in a graphical format, which may include additional indications (e.g., via colored data points) of optimal product offerings based on the financial, employee perception, and market competitiveness goals.

Figure 5A:
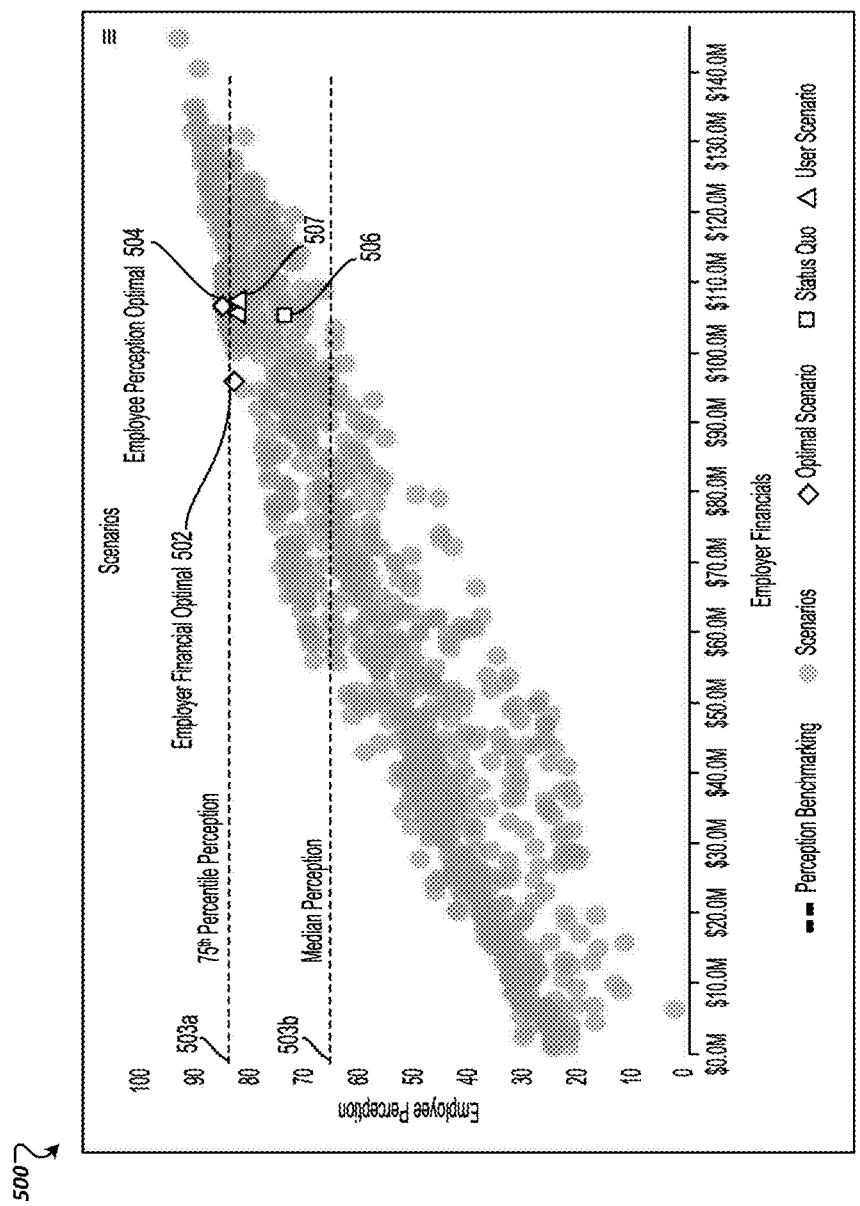
Figure 5B:
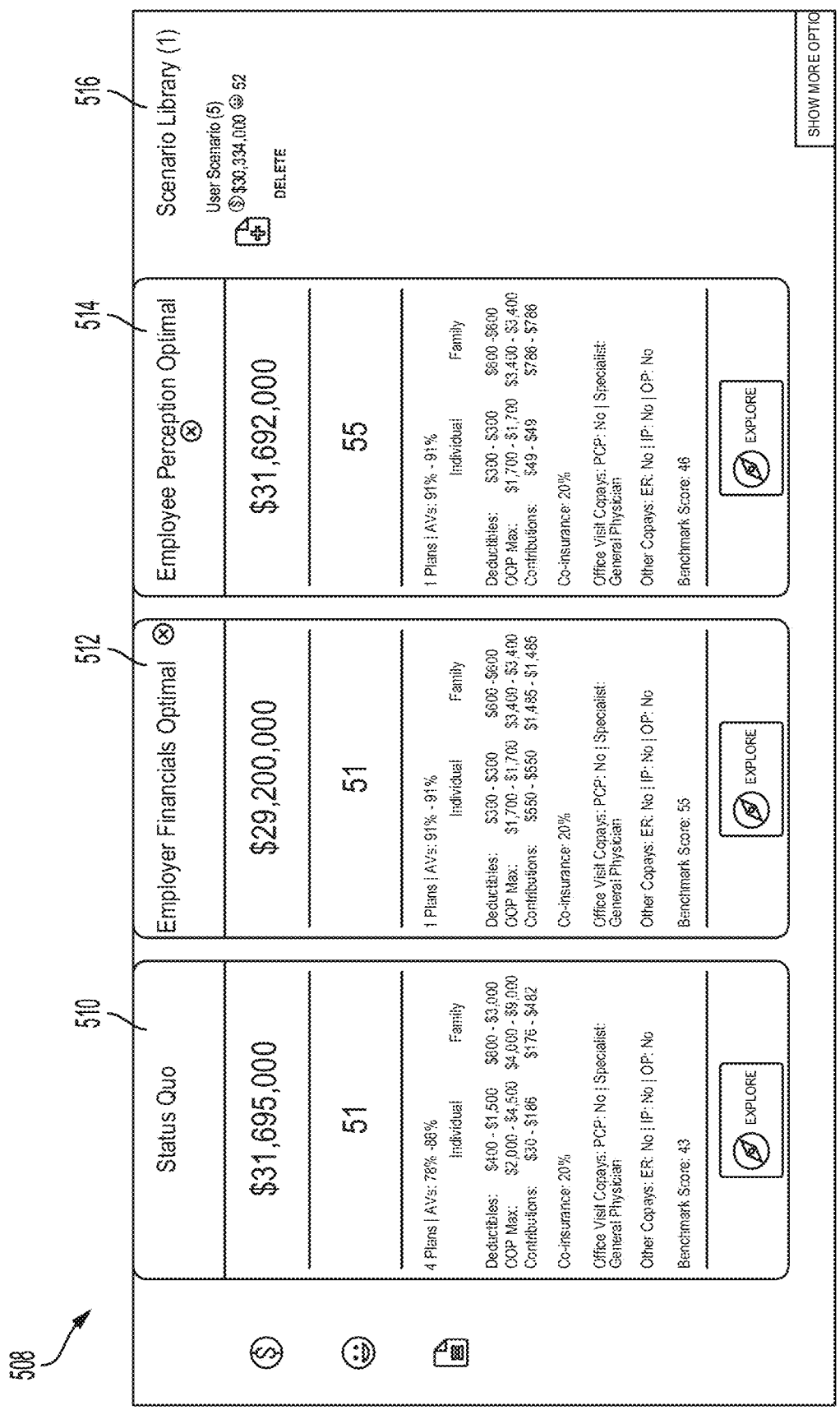

FIGS. 5A-5B illustrate exemplary results GUI screens that present information regarding the generated product offering scenarios and optimal scenarios based on the goals and preferences provided by the client 302. For example, FIG. 5A illustrates an exemplary graphical results GUI screen 500 in which each scenario may be plotted as a function of provider financial costs versus an employee perception score. In some examples, the graphical results GUI screen 500 may include data points for every generated product offering scenario or just for product offering scenarios that fit within the goals and preferences of the client 302. In addition, the GUI screen 500 may display the data points for the status quo scenario 506 as well as an optimal employee perception scenario 504, an optimal provider financial scenario 502, and a user-defined scenario 507 (see FIGS. 5A and 5D) in different colors than the other scenario data points to allow the client to visibly see how the status quo, optimal, and user-defined scenarios compare to other generated scenarios. The platform 304 may also dynamically adjust the color of data points selected by the client 302 for addition to a scenario library.

In some implementations, the screen 500 includes identification of scenarios falling within a range of employee perception benchmarking (e.g., between a median perception score and a $75^{th}$ percentile perception score). As illustrated, a median perception score 503b is presented as a dotted line across the graph, while a 75$^{th}$ percentile perception score 503a is presented as a dotted line across the graph and above the median perception score 503b. In other embodiments, more or fewer perception benchmarks may be provided.

Perception benchmarking may provide the employer with a greater understanding of how pleased employees are with their benefits options at peer organizations in comparison to the present options (status quo 506), various considered scenarios 507, the employee perception optimal 504, and the employer financial optimal 502. The perception benchmarking information, in some implementations, is compiled from a number of peer organizations sharing one or more similarities with the employer. The similarities, in some examples, can include an industry, a geographic region, an organizational size (e.g., small business, midsized business, large entity, etc.), and/or a type of organization (e.g., public, private, non-profit, governmental, etc.). In another example, the similarities can include similarities in employee base such as an average or median age, an average or median salary, a percent female employees, a percent of employees opting for a family plan, an age distribution (e.g., within a series of ranges), and/or a salary distribution (e.g., within a series of ranges). In a particular example, the perception benchmarking may be drawn from entities with similarities in employee base not diverging from the employer's employee base by more than a threshold (e.g., percentage, value, or logarithmic distribution). In another example, the peer benchmarking information is drawn from a simple similarity or set of similarities, such as industry, while one or more outlier scores may be removed from the calculation of the perception score. The perception benchmark scores may be calculated, in some examples, as an average or median. If perception score data is available for a number of calendar years, the most recent calendar year data may be used exclusively or promoted in the calculation.

In some implementations, in addition to providing peer perception score benchmarking, the employer may be presented with information regarding the general, combined employee base underlying the peer perception score. Turning to FIG. 6H, in some implementations, a perception benchmarking screen shot 658 displays general peer entity statistics 660, as well as peer plan attributes 662 presented in comparison to client attributes 664, peer perception score distribution 666 presented in comparison to client score 668 and peer demographics 670 presented in comparison to client demographics 672. The statistics 660, plan attributes 662, 664, and demographics 670, 672 may all be presented to provide the reviewer with an understanding of the similarities (and relative differences) between the peer population used for benchmarking purposes and the employer.

In some embodiments, the user may be provided the opportunity to narrow the similarities in one or more areas. For example, if the average salary of peer demographics 670 initially deviated from the employer average salary by more than ten percent, the employer may have opted to narrow the gap and similarly reduce a number of lives 660c involved in the benchmarking analysis.

FIG. 5B illustrates an exemplary scenario summary GUI screen 508 that provides a snapshot view of the status quo 510, optimal employee perception score 514, and optimal financial score 512 data points shown in FIG. 5A as well as a list of any selected scenarios that are stored in a scenario library 516. For each of the status quo 510, optimal employee perception score 514, and optimal financial score 512 data points, the GUI screen 508 provides the corresponding financial score and employee perception score.

FIG. 5C illustrates an exemplary user-defined scenario GUI screen 530 which allows users to modify some or all plan attributes 532 for the plans 534 of a particular product offering scenario and/or design an entirely new product offering scenario. In some implementations, upon selection of a "run" selector 536, the platform 304 recalculates the financial score and employee perception score for the user-defined scenario and dynamically plots a data point for the user-defined scenario on the graph in the GUI screen 500 (FIG. 5A) so that the client 302 may instantly compare the user-defined scenario to the scores for the optimized and status quo scenarios. Additionally, in response to receiving the attributes for the user-defined scenario, the platform 304 may dynamically update a waived coverage percentage for the user-defined scenario at a waived coverage display field 538 that indicates the percentage of members that may waive coverage of one of the plans in the user-defined scenario. In some examples, the GUI screen 530 may also include a run log 540 that tracks the runs of user-defined scenarios, which is dynamically updated to provide a summary of the attributes of each of the user-defined scenarios, which may include whether individual attributes 532 have been increased, decreased, added, and/or eliminated.

In some implementations, plan attributes 532 provided in the GUI screen 530 may also include voluntary benefit attributes and/or wellness plan attributes that can be provided to members in addition to the benefits provided within the plans 534. In some examples, the voluntary benefits and wellness plan attributes may include medical or non-medical related benefits that may be provided at the member's expense or at least partially paid for by the employer. For example, the voluntary benefits may include a variety of insurance products including accident, critical illness, hospital indemnity, pet, identity theft, long-term care, legal assistance, as well as insurance for ancillary medical services such as hearing aids, doctor/nurse hotline services, or lab testing. Wellness plan attributes, in some examples, may include gym membership plans, stress management classes such as yoga or meditation, weight loss program plans, activity tracking device purchase, preventative health screenings, nutrition counseling, community supported agriculture (CSA) programs, and smoking cessation programs.

In some implementations, providing one or more of the voluntary benefits to members can improve the employee perception score with no impact or minimal impact to the employer financial score (cost). In some implementations, employee perception scores, financial scores, and market competitiveness scores can be computed for user-defined and/or platform-generated product offering scenarios that include one or more of the voluntary benefits. In some examples, the platform 304 can identify, for each of the product offering scenarios, which of the voluntary benefits provide a greatest amount of improvement in the employee perception score, and/or market competitiveness score. Further, in some implementations, the platform 304 may identify both a fully voluntary (unfunded) impact as well as one or more optional employer funding levels along with corresponding impact to the employer financial score. Additionally, the platform 304 may use the amount of change in the employee perception score with the addition of one or more fully and/or partially employer-funded voluntary benefits to predict an anticipated level of interest of the members as well as a predicted change in number of members who waive insurance.

In some implementations, the employee perception scores and employer financial scores for each product offering/voluntary benefit combination at multiple employer funding levels can be presented as additional data points within the graphical results GUI screen 500 to provide a graphical depiction to the client 302 of the effect that offering voluntary benefits has on employer cost as well as employee perception. In one example, when a particular data point associated with a product offering is selected by the client 302 at the GUI screen 500, the platform 304 may dynamically cause one or more additional data points corresponding to variations of the selected product offering that also include one or more voluntary benefits to be highlighted in a different color or shading pattern than the unselected data points. Highlighting the additional data points incorporating voluntary benefits into the product offering allows the client 302 to visualize the impact that the voluntary benefits have on the employee perception score, financial score, and/or market competitiveness score. In another example, the platform 304 may dynamically output a second graphical results GUI screen 500 that includes the selected data point and additional data points that include voluntary benefits.

Figure 5D:
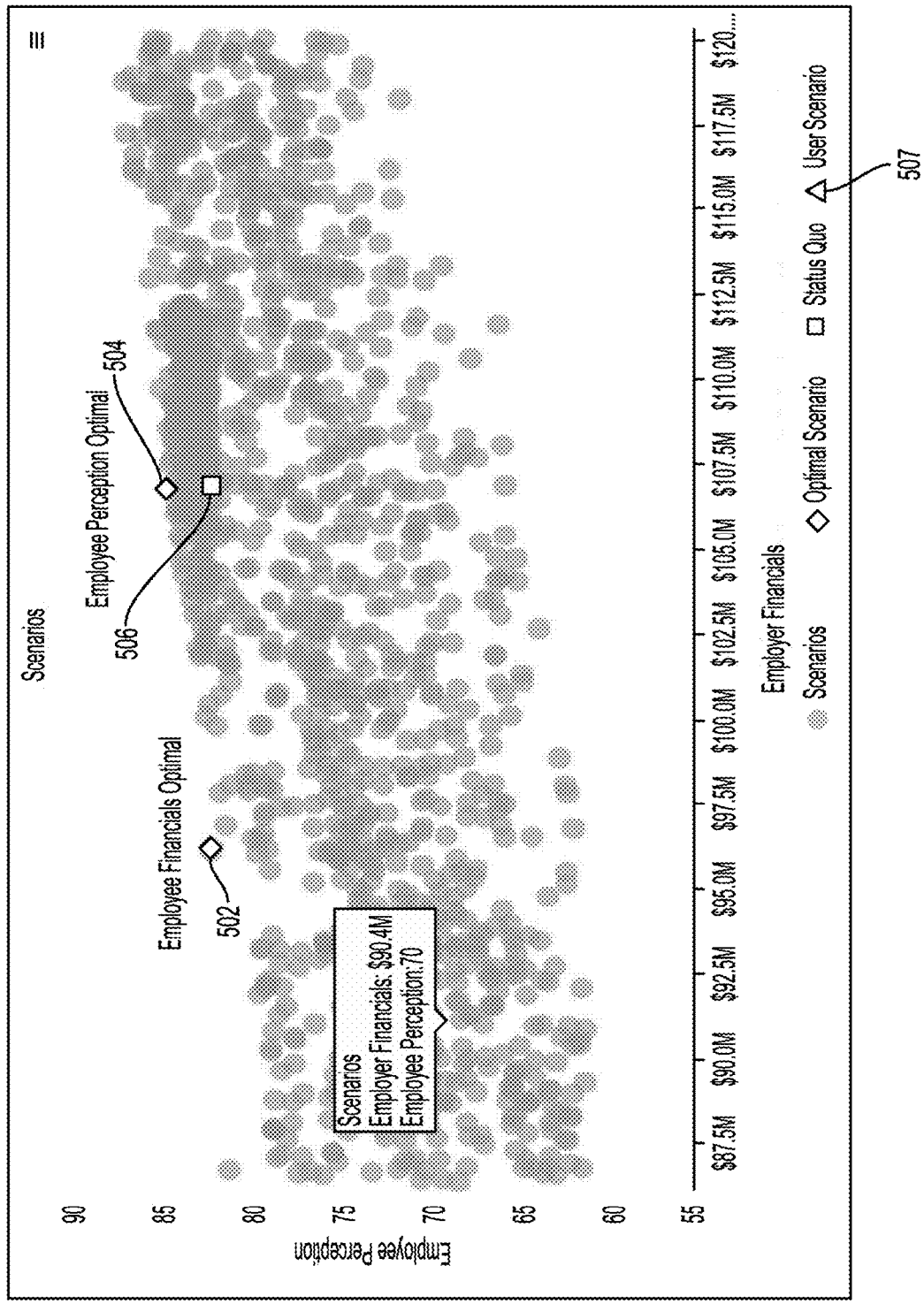

Returning to FIG. 3, the client 302 can interact with the results GUI screens 500 and 508 by adjusting output filter settings (326), which causes the platform 304 to dynamically update the presentation of data within the results GUI screens 500 in real-time (328) so that the product offering scenarios displayed on the GUI screens 500 reflect the preferences and goals of the client 302. For example, FIG. 5D illustrates filtered product offering scenarios that are displayed in the GUI screen 500 based upon filter adjustments provided by the user at user interface 518 shown in FIG. 5E. In some examples, adjustable filter settings user interface 518 that can be displayed in either of the GUI screens 500 or 508, which allows the client to adjust minimum and maximum values for displayed financial scores, employee perception scores, and deductibles as well as numbers of plans included within displayed scenarios and types of plans (PPO, HMO, HDHP) that are displayed.

Figure 6A:
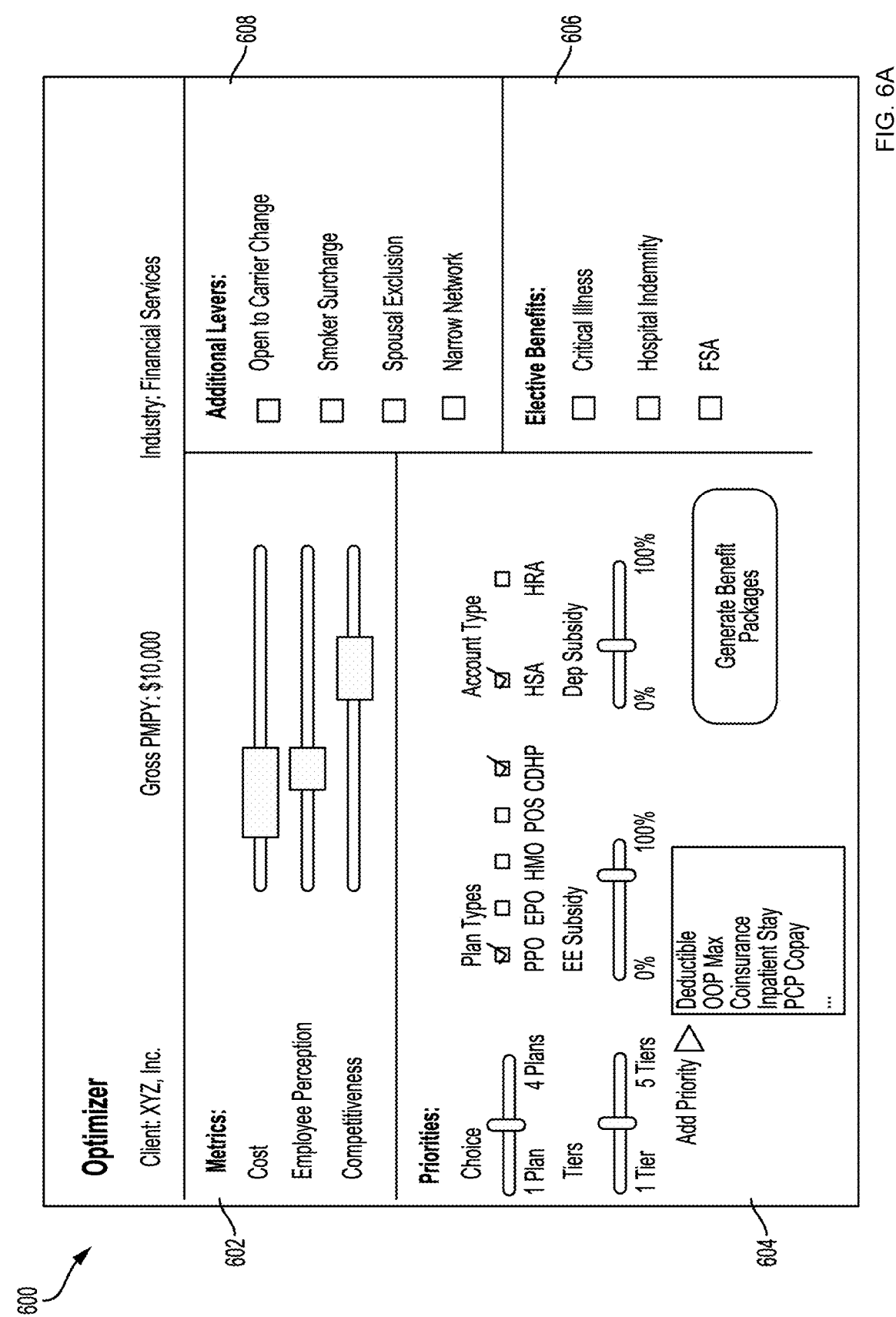
FIGS. 6A-6B illustrate example filtering screens.

FIG. 6A illustrates another example of an adjustable filter setting user interface 600 that provides the client 302 the ability to modify which of the product offering scenarios are displayed within a results GUI screen. In some implementations, the filter setting user interface includes a metrics section 602 with sliders that allow the client 302 to adjust ranges for financial score (cost), employee perception score, and market competitiveness. The filter setting user interface 600 may also include a priority section 604 with various sliders and selectors that allow the client to indicate a desired number of insurance plan choices, number of tiers within a plan, employee and dependent subsidies, savings fund account types, plan types, deductible amounts, out-of-pocket maximums, coinsurance, inpatient stays, and/or PCP copays. An elective benefits section 606 allows the client 302 to select additional benefits such as critical illness, hospital indemnity, and/or flexible spending account (FSA). An additional options section 608 may include additional option selectors for being open to an insurance carrier change, smoker surcharge, spousal exclusion, and/or narrow network. In response to receiving adjustments to filter settings, the platform 304 may, in real-time, add or remove data points that are displayed on the GUI screen 500 (FIG. 5A) to reflect the changed filter settings. Additionally, changing the filter settings may also cause a change in which scenarios are displayed as optimal scenarios with respect to employee perception score and financial score (e.g., data points 502 and 504 in FIG. 5A).

Figure 6B:
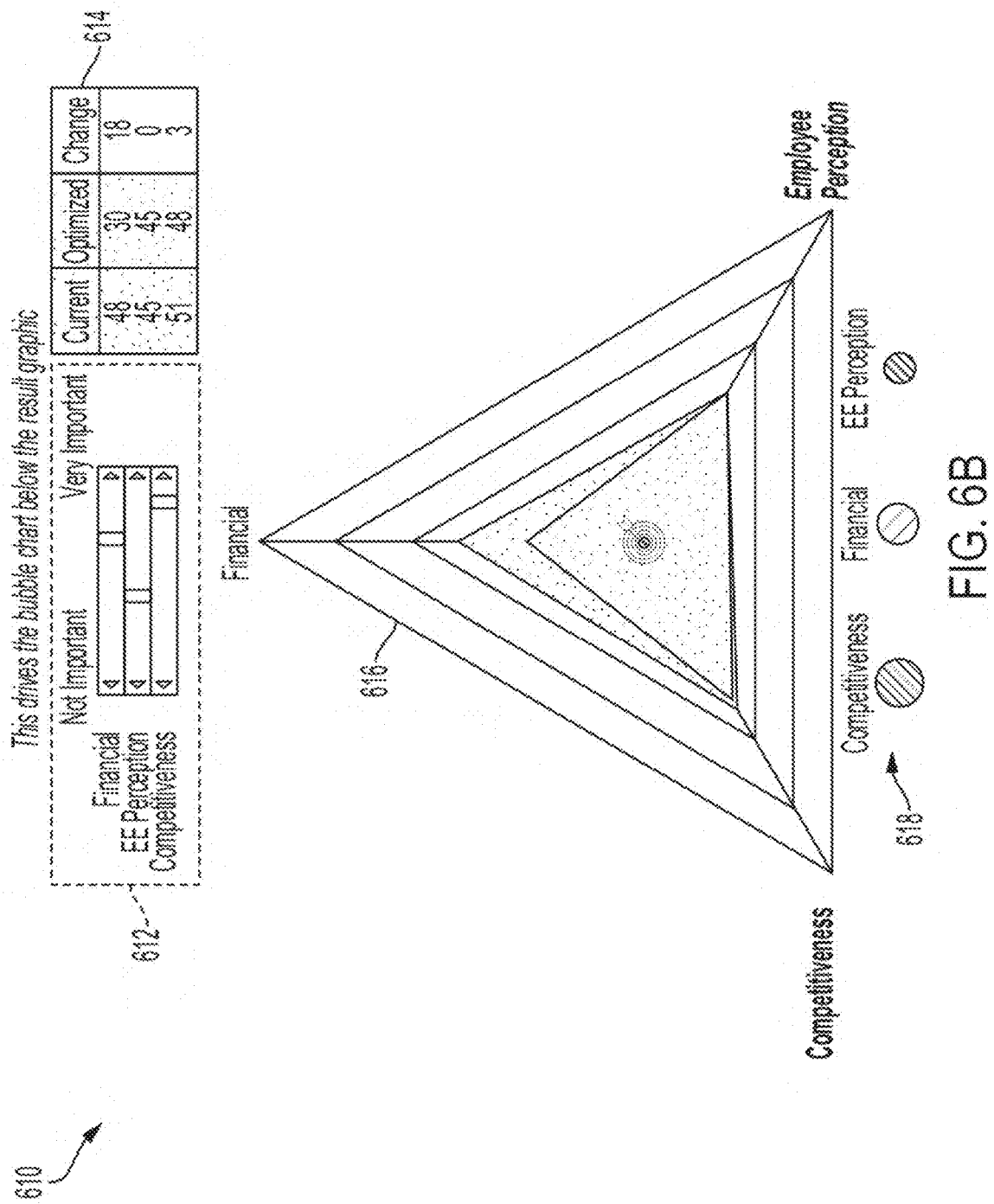

FIG. 6B illustrates yet another example of an adjustable filter setting user interface 610 that enables the client to adjust weighting factors that are applied to the financial, employee perception, and market competitiveness scores when identifying the optimal product offering scenarios for the client 302. In some examples, the filter setting user interface 610 includes a set of sliders 612 at which the client 302 can adjust the slider between "not important" and "very important" to indicate a relative degree of importance of financial score, EE perception score, and market competitiveness score when selecting an insurance product offering. In some implementations, the setting user interface 610 may also include a chart 614 that provides values for the positions of the importance sliders 612 and includes columns for the current or status quo product offering, optimized slider values, and a difference between the status quo and optimized values. The user interface 610 may also include a web graph 616 that illustrates a difference between the status quo and optimized values indicated by the sliders 612 and a bubble graph 618 that indicates relative importance of the financial, employee perception, and market competitiveness scores. As the sliders 612 are adjusted, the platform 304 causes the chart 614, and graphs 616 and 618 to dynamically adjust in real-time to reflect the change.

Returning to FIG. 3, the client 302 can make scenario selections by selecting one or more data points at the results GUI screen 500 (330), in some implementations, which are, in response, stored within a scenario library by the platform 304 (332). In some embodiments, the platform 304 presents a summary of the selected scenarios to the client 302 (334), which may include rate details and a summary of benefits, and a notification of the selected plans is sent to the brokers 306 (336). In some implementations, the plan selections are used by the client 302 when determining which insurance product offerings to provide to members. In some embodiments, the selection summary is output in a report format instead of or in addition to the GUI format, which can be printed or transmitted to other users via email or other data messaging format.

Figure 5E:
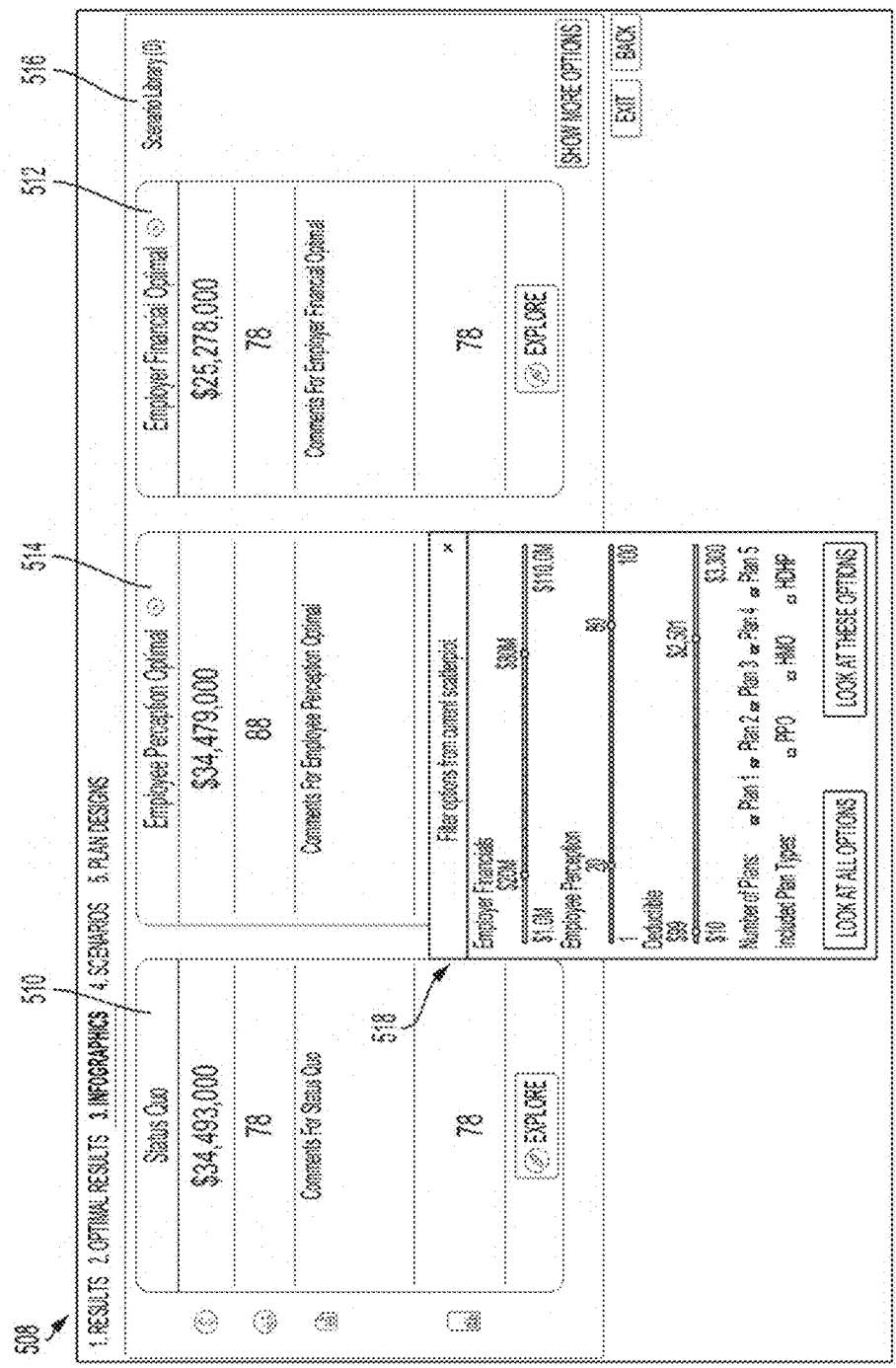
Figure 5F:
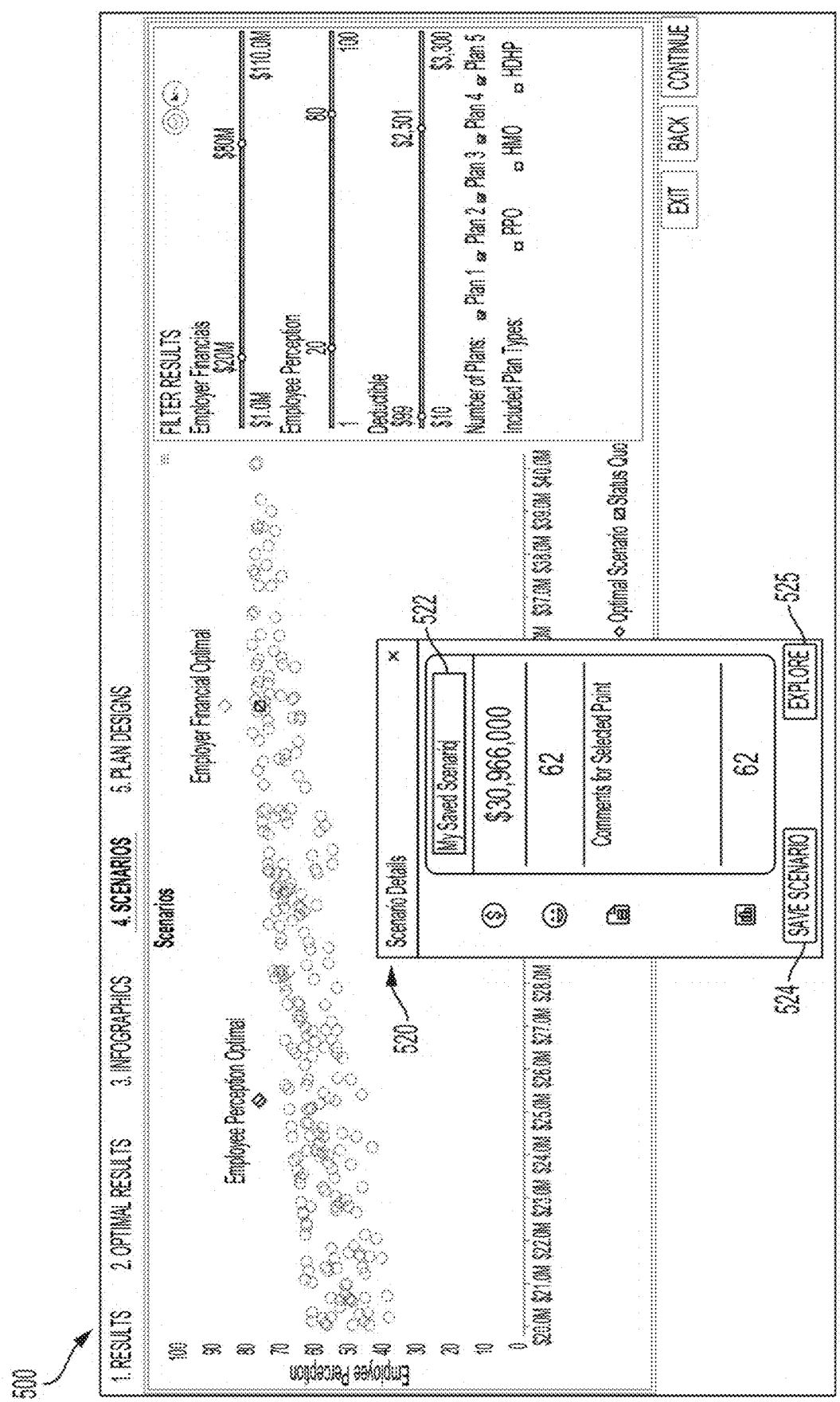
Figure 5G:
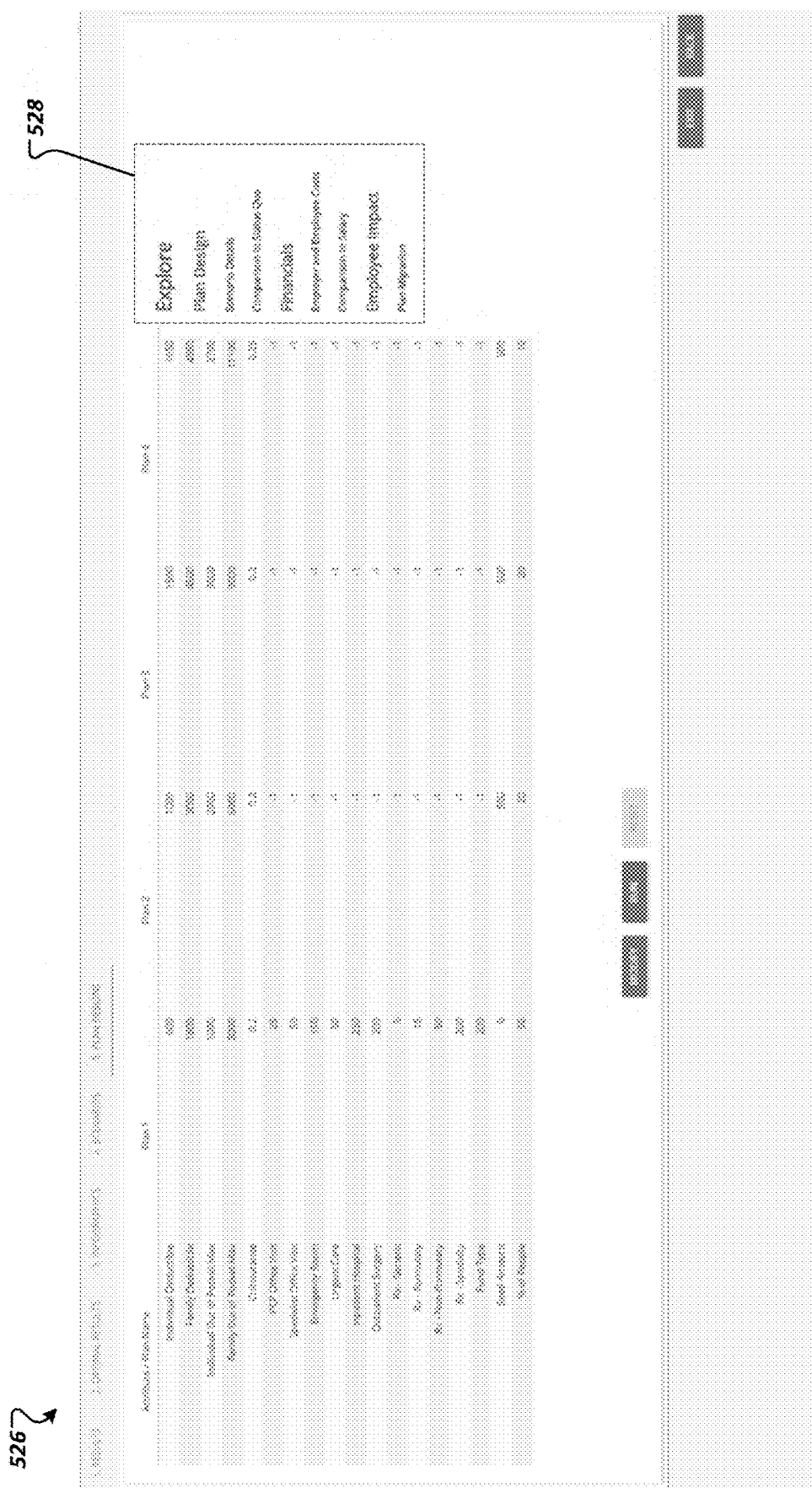

FIGS. 5F-5G illustrate example scenario selection at the GUI screens 500 and 508. As shown in FIG. 5F, when a data point is selected at the results GUI screen 500, a scenario details user interface 520 may be displayed that provides the financial and employee perception scores, as well as other information, for the selected scenario and allows the client 302 to input a name for the scenario at input field 522. In some embodiments, the platform 304 also dynamically adjusts a color or appearance of the plotted data points for product offerings in response to selection of the product offerings by the client 302. When the client 302 selects an "explore" selector 525, additional GUI screens may be presented that allow the client 302 to view additional details regarding the selected product offering. When the client selects a save selector 524, for example, the scenario is added to a customized scenario library for the client, and a total number of saved scenarios is increased in the scenario library section 516 of the scenario summary GUI screen 508 as shown in FIG. 5B.

FIG. 5G illustrates a plan summary GUI screen 526 that provides a summary view of the insurance plans included in a particular selected scenario. The GUI screen 526 may also include additional selection options 528 that trigger the display of other GUI screens that allow the client 302 to visualize a comparison of the scenario to one or more additional scenarios such as the status quo scenario, provider and employee costs, and projected number of members who may migrate from their current insurance plan to an insurance plan within the selected scenario. In some implementations, when the client 302 selects a particular product offering scenario to be added to the scenario library, the individual rate details may be calculated on-the-fly in real-time. For example, in some embodiments not all of the scenario data for the client is maintained in the data repository due to the size of the data file such that data may be generated on the fly once selections are made by the client.

Turning to FIGS. 6C-6G, additional output GUI screens are illustrated, which may provide additional information to the client regarding product offering scenarios that fit within the client's financial, employee perception, and market competitiveness goals. In some implementations, the information and graphics provided in FIGS. 6C-6G may also be presented in a report format that may be transmitted from the platform 304 to the client 302 and/or broker 306 via email that includes an attachment or weblink. In other examples, the broker 306 may download the report directly from the platform 304 in a predetermined format. Additionally, the output GUI screens illustrated in FIGS. 6C-6G may also be dynamically updated in response to client adjustment of filter parameters as described above (FIGS. 5A-5G and FIGS. 6A-6B).

Figure 6C:
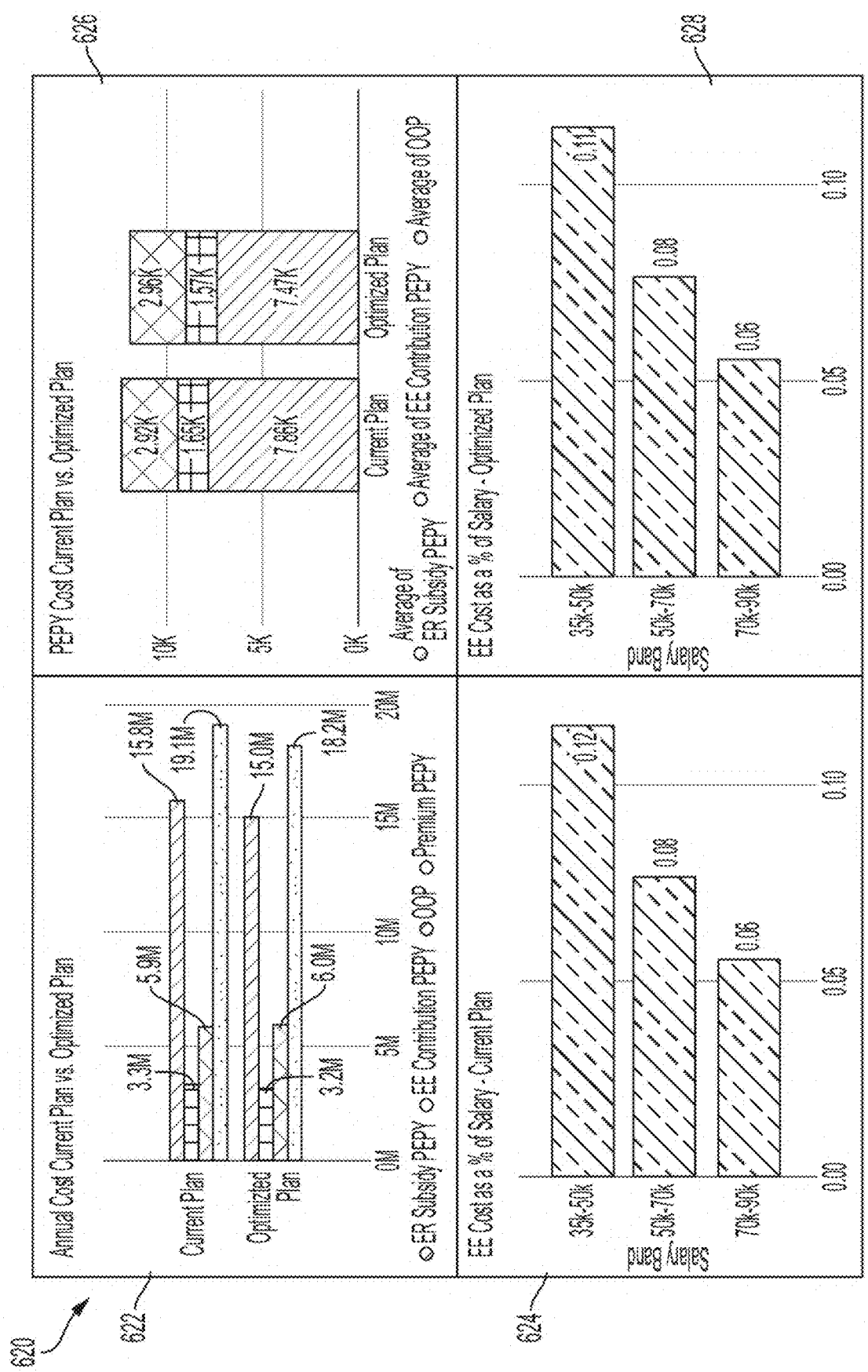
FIGS. 6C-6G illustrate example GUI screens that display results of product recommendations.

For example, FIG. 6C illustrates an example output GUI screen 620 that provides graphical representations of costs associated with an optimized product offering scenario. Graph 622, in some implementations, illustrates annual costs (e.g., employer subsidy, employee (EE) contribution, employee out-of-pocket, and premium) for the status quo product offering and the optimized product offering. Graph 626 illustrates per employee per year (PEPY) costs for the status quo plan versus the optimized plan, and graphs 624 and 628 illustrate employee costs as a percentage of salary for both the status quo product offering and the optimized product offering.

Figure 6D:
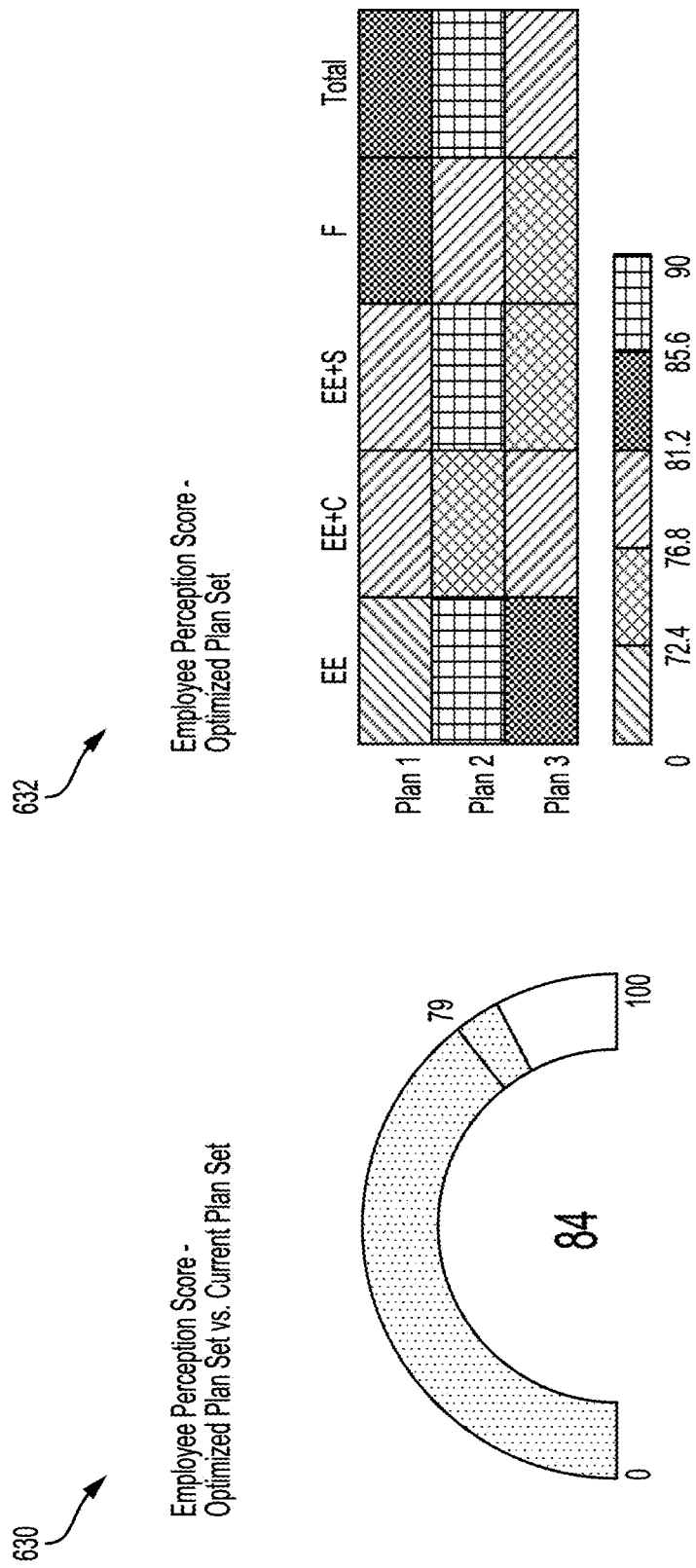

FIG. 6D illustrates example output GUI screen graphics 630, 632 that provide visualization of employee perception score. For example, graphic 630 provides a visual indication of a difference between the status quo and optimized employee perception scores, and graphic 632 provides a visual indication of employee perception score across the various plans of a product offering scenario and across coverage tiers (employee (EE), employee plus child(ren) (EE+C), employee plus spouse (EE+S), family (F), and total), which allows the client 302 to see how employees in different coverage tiers can have different perception scores for the same insurance plan.

Figure 6E:
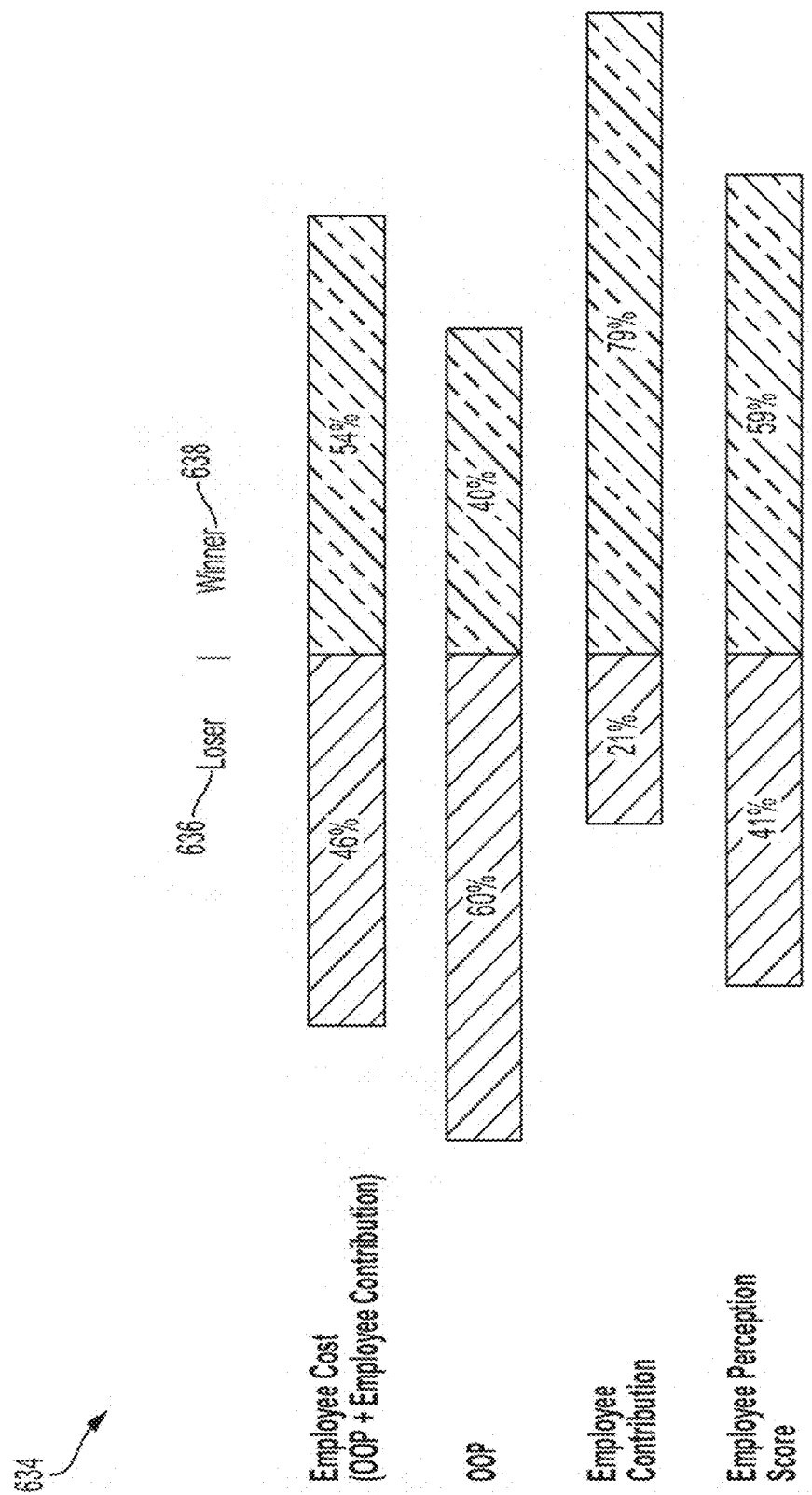
Figure 6F:
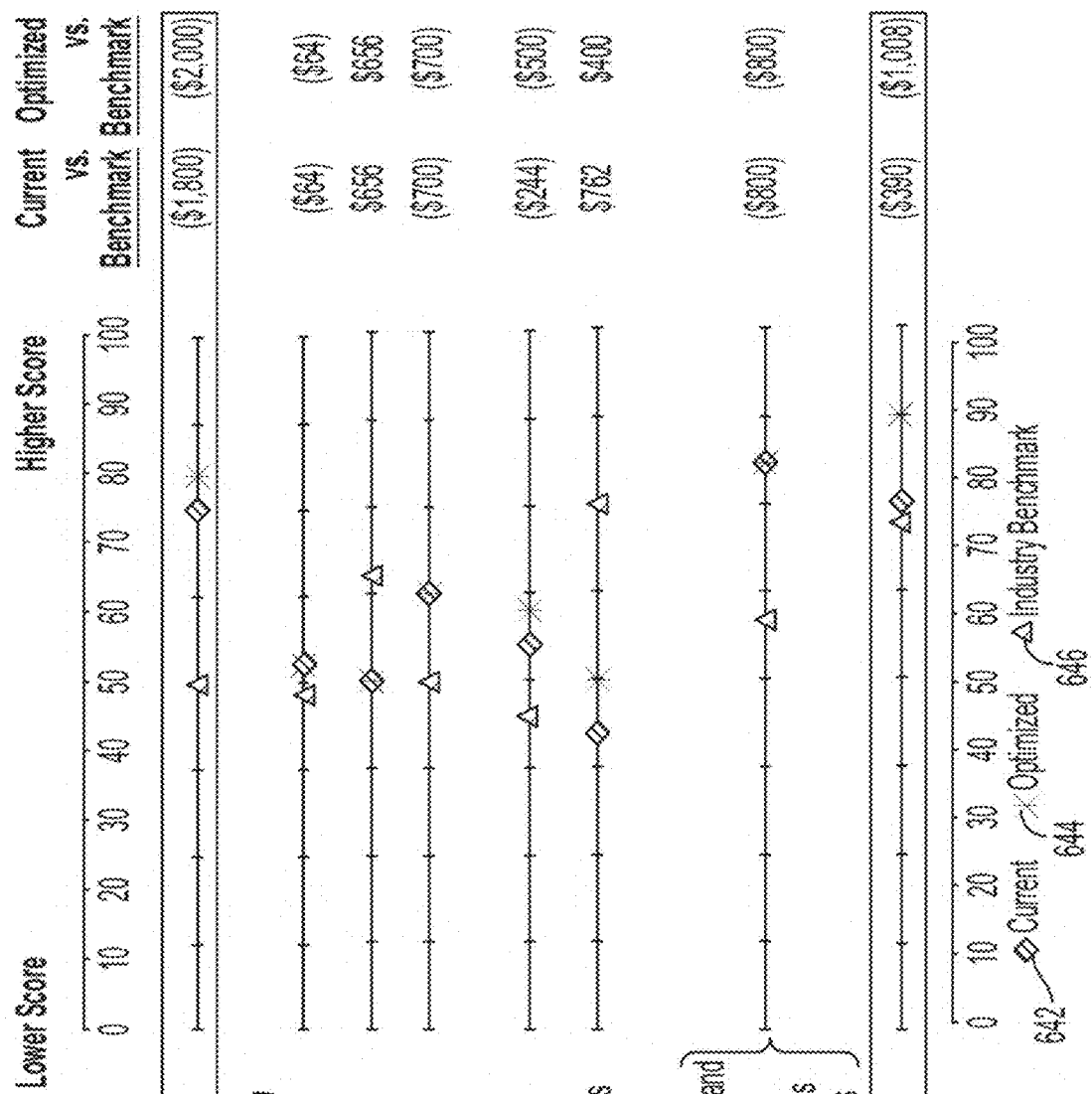

FIG. 6E illustrates an example output GUI screen graphic 634 that includes bar graphs of percentages of the generated product offering scenarios that meet the client's goals and preferences with respect to employee costs and employee perception score. For example, for each category (e.g., employee cost, employee out-of-pocket, employee contribution, and employee perception score), the graphic 634 shows percentages of "winners" 638 and "losers" 636. In some examples, the "winners" 638 refer to the percentage of members who are seeing a reduction in employee cost, employee out-of-pocket, employee contribution, or an increase in employee perception score for a particular scenario. FIG. 6F illustrates an example output GUI screen graphic 640 that compares the status quo 642, optimized 644, and industry benchmark 646 product offering scenarios across various employee cost parameters.

Figure 6G:
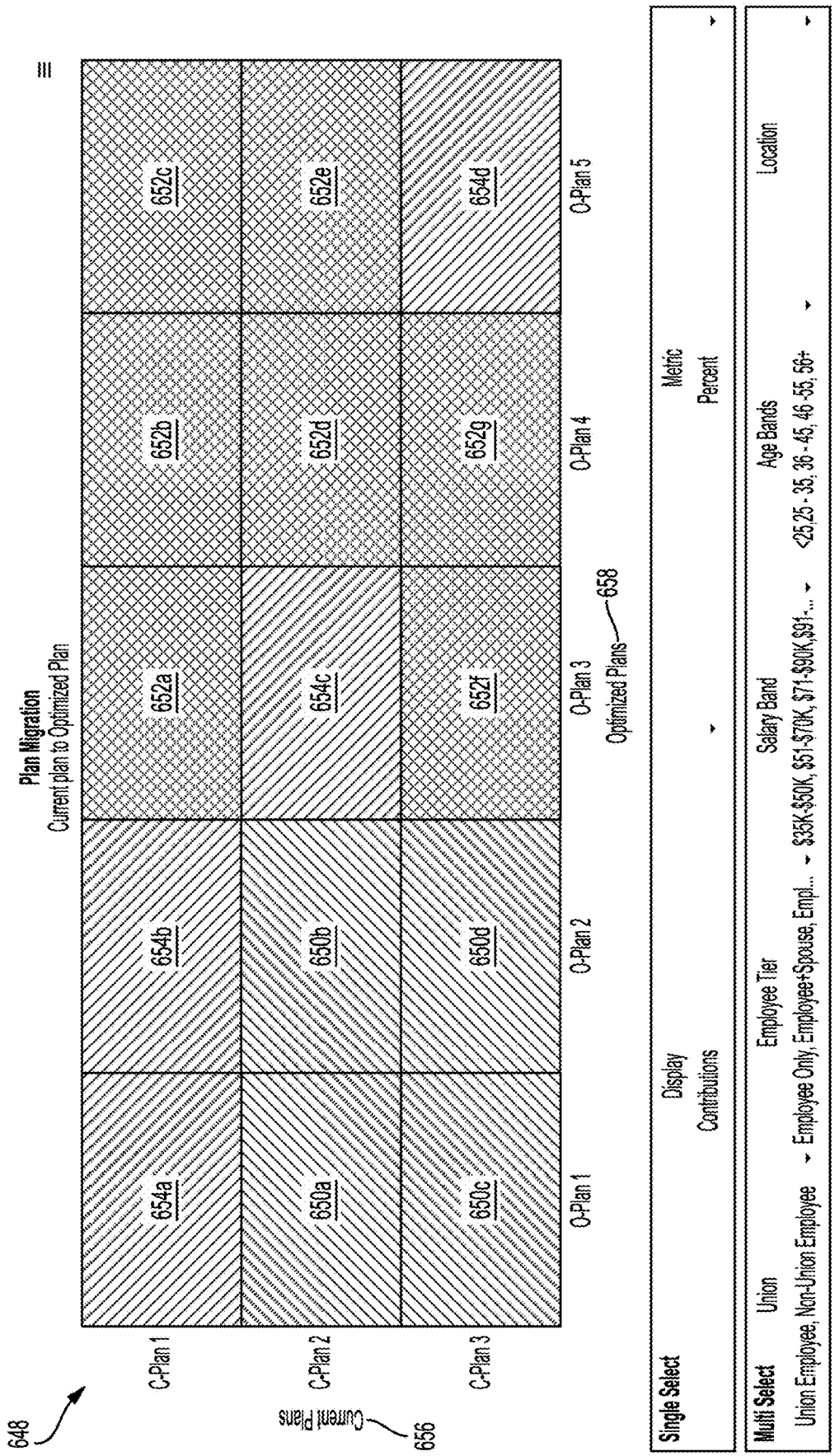

FIG. 6G illustrates an example output GUI screen 648 that includes a grid with predicted plan migrations to optimized plans (O-Plan 1, O-Plan 2, O-Plan 3, O-Plan 4, O-Plan 5) 658 within one or more product offerings from a status quo (e.g., current) plan (C-Plan 1, C-Plan 2, C-Plan 3) 656. In some implementations, each grid cell may include color-coded and/or labeled to indicate whether a member is better off 650, worse off 652, or approximately the same (neutral) 654 for having migrated to a particular optimized plan 658 from a particular status quo plan 656. In some examples, the platform 304 may consider members to be better off if moving from a particular status quo plan to a particular optimized plan results in greater than a threshold decrease (in percentage and/or dollar amount) in contributions. In one example, "better off" grid cells 650 may be colored green, "worse off" grid cells 652 may be colored red, and "neutral" grid cells 654 may be colored blue. Members may be considered to be worse off if moving from a particular status quo plan to a particular optimized plan results in greater than a threshold increase (in percentage and/or dollar amount) in contributions. If the change in contribution is less than the threshold increase or decrease, the migration may be considered to be neutral. Because it is possible for employees within the same grid cell to be impacted differently by the plan migration (e.g., member in a single tier sees a contribution decrease, but the family tier sees an increase), the cells within the grid may be color coded based upon the percentage of members associated with each cell that are better off or worse off. For example, for "better off" grid cells 650, more than a threshold percentage/number (e.g., 60%) have a reduced member contribution. For "worse off" grid cells 652, more than a threshold percentage/number have an increased member contribution, and for "neutral" grid cells 654, between upper and lower percentages/numbers (e.g., 40% to 60%) have a reduced member contribution. In some examples, each of the grid cells 650, 652, 654 may be labeled with a count and/or percentage of members that falls into each division and how many people within that grid cell are better off In some implementations, in addition to employee contribution, the GUI screen 648 may also present the grid to include additional metrics such as union vs. non-union employees, employee tiers, salary bands, age bands, and location.

In some implementations, additional information and graphics regarding product offering scenarios that fit within the client's financial, employee perception, and market competitiveness goals can be provided as dashboard interface screens or within reports that are transmitted to the client. In one example, a census data graphic can include information related to the census data for the client 302 and for a general population. For example, the graphics may be a snapshot view of average age, average salary, gender mix, and average actuarial value (AV), a bar graph that illustrates percentages of members that fall within three different salary bands, and/or a graphic that illustrates the fractions of members that fall within different age ranges.

Additionally, information regarding the plans that are a part of the optimized product offering scenario may be presented in a tabular format such as an employee cost breakdown shown in Table 3 below. Additional graphics may provide a summarized comparison of the optimized plan to the market and status quo plans in different layouts. For example, GUI screens and/or report graphics may provide an overall summary, a financial summary, a market competitiveness summary, an employee perception summary, and consolidated optimization scores for the optimal and status quo plans. In some implementations, the platform 304 can calculate a consolidated optimization score to identify one "optimized" product offering scenario. The consolidated optimization score may be a combination of the financial score, the market competitiveness score, and the employee perception score with the importance weighting factors for each of the scores indicated at filter user interface 610 (FIG. 6B) applied.

TABLE 3

|  | Plan 1 | Plan 2 | Plan 3 |
| --- | --- | --- | --- |
| Deductible (Single/Family) | $500/$1000 | $1500/$3000 | $3500/$7000 |
| Out of Pocket Maximum (Single/Family) | $2500/$5000 | $3500/$7000 | $6500/$13000 |
| Coinsurance | 10% | 10% | 20% |
| PCP/Specialist/Urgent Care | $10/$20/$10 | Ded./Coins. | Ded./Coins. |
| Emergency Room | $500 | Ded./Coins. | Ded./Coins. |
| Outpatient Surgery | $500 | Ded./Coins. | Ded./Coins. |
| Inpatient | $1500 | Ded./Coins. | Ded./Coins. |
| Pharmacy (Generic/Formulary/Non-Formulary) | $10/$20/$40 | $10/$20/$40 | Ded./Coins. |

Figure 7:
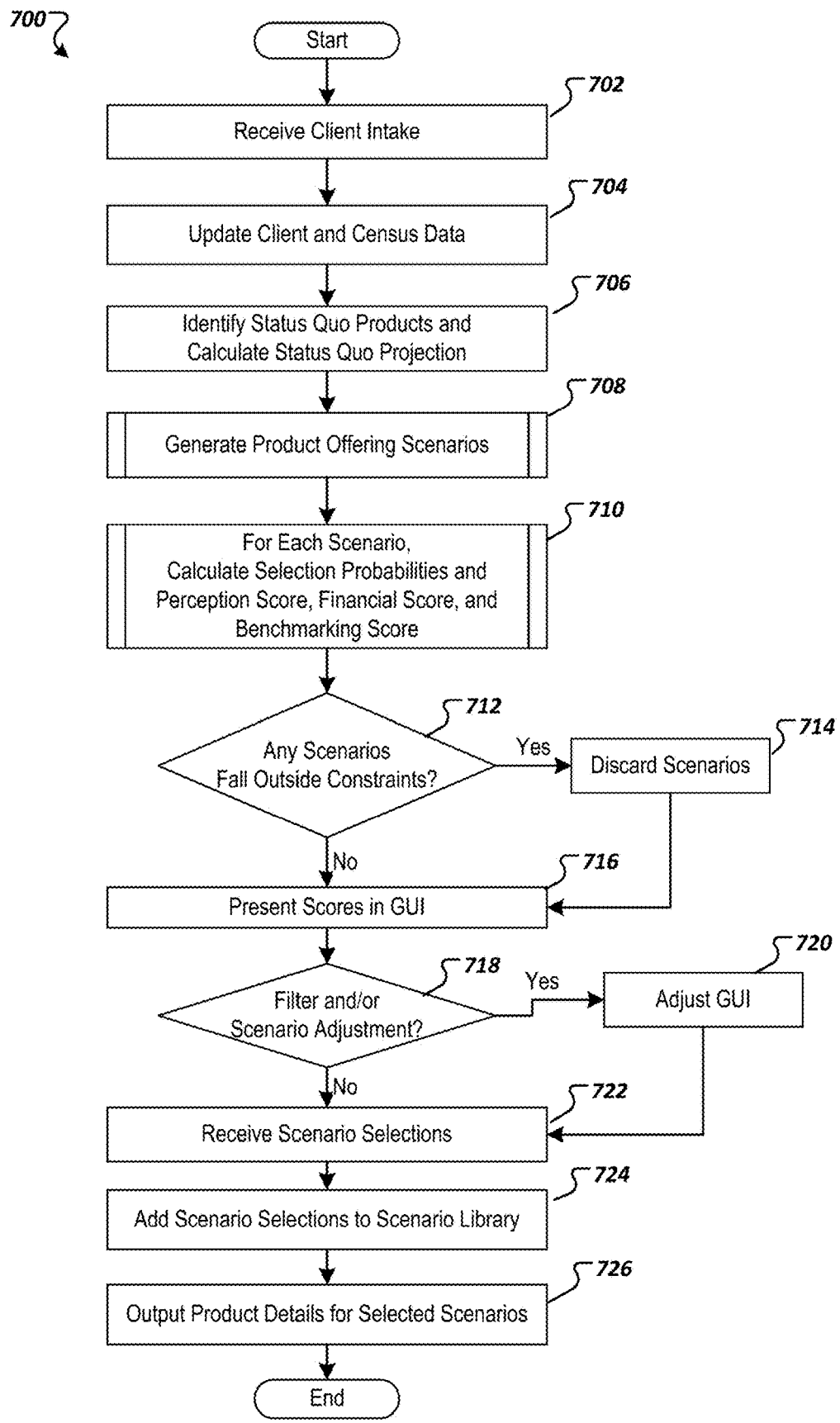
FIG. 7 illustrates a flowchart of an example process for generating product recommendations.

FIG. 7 illustrates a flowchart of a method 700 for generating product recommendations for clients. In some implementations, the method begins with receiving a client intake form (702) at a computing system, such as the subscription product management system 102 (FIG. 1). For example, a client, such as a provider, may submit a client intake form 400 (FIG. 4A) that includes preferences and goals for the health insurance products that are provided to members, particularly with respect to provider financial considerations, market competitiveness of the provided insurance plans, and employee perception of the value of the provided insurance products. In some examples, the client intake form may also include demographic information about the members of the company. In response to receiving the client intake form, in some implementations, the client data and member census data for the client is updated (704) and saved in a data repository (e.g. data repository 112 in FIG. 1).

In some implementations, based on the information provided in the client intake form, a status quo product offering scenario is identified and a corresponding status quo projection can be calculated (706). In some examples, the status quo product offering can correspond to the current product offering provided by the client (a provider) to members, and a status quo projection represent costs for the status quo product offering scenario for the upcoming year. For example, a subscription product management system 102 may include a GUI engine 132 that presents a client intake form to a user, which includes input fields for status quo product information (FIG. 1). The client intake form may include input fields where the client inputs details of the status quo product, or information about the product can be retrieved from a data repository, such as the data repository 112. Conversely, for a new organization, a status quo may be identified based upon peer benefits offerings.

Figure 8:
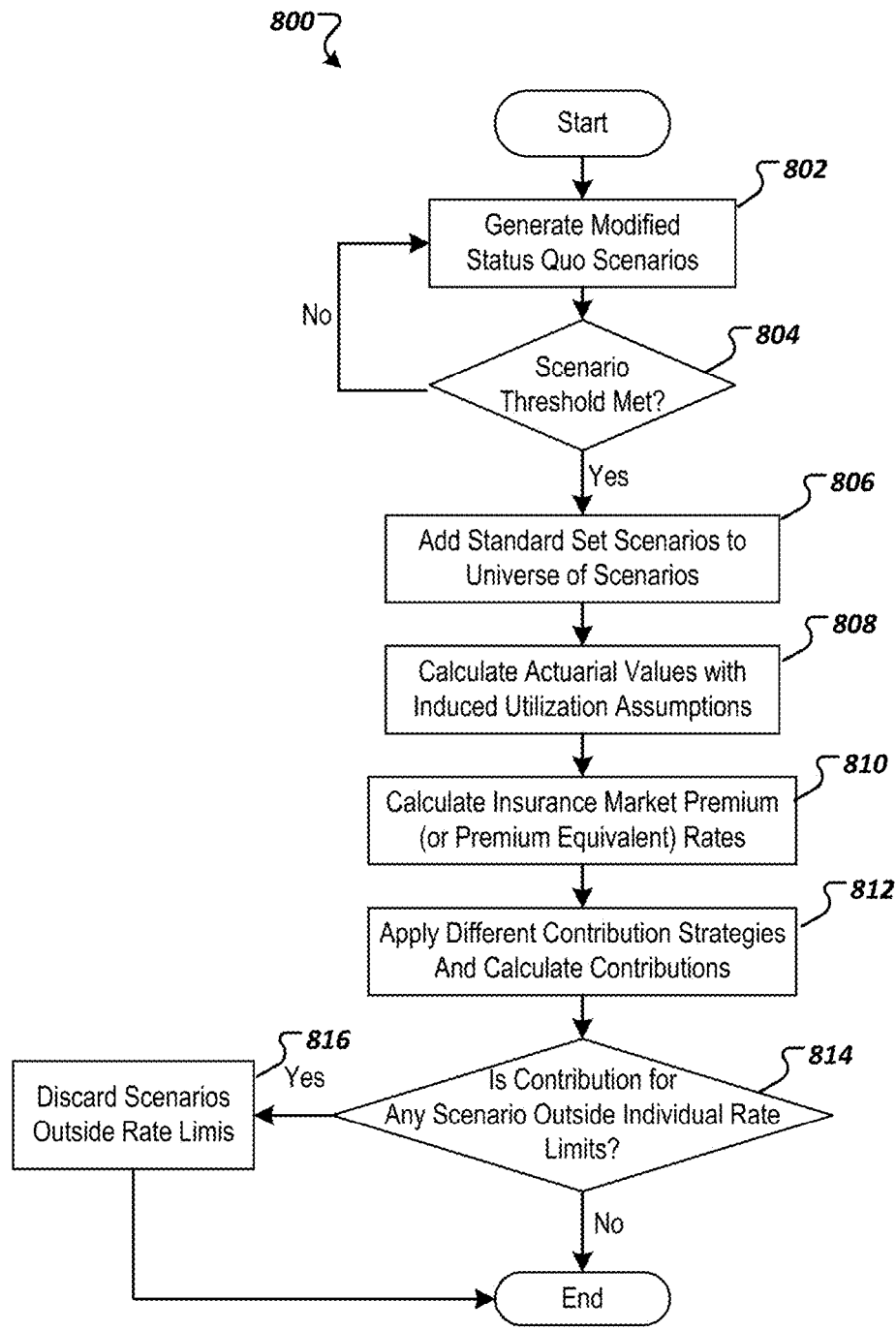
FIG. 8 illustrates a flowchart of an example process for generating product offer scenarios.

The details of the status quo product, in some implementations, is used to generate at least some product offering scenarios that can be offered to the client to consider for purchase (708). In some examples, the generated product offering scenarios may be referred to as a universe of scenarios. FIG. 8, for example, presents a flowchart illustrating an example method 800 for generating product offering scenarios for the universe of scenarios either from the status quo product or from a standard set of product offerings, which can generate over a million product offering scenarios. In some implementations, the process begins with generating product offering scenarios that are modifications from the status quo scenario (802), which may include adding plans, eliminating plans, or modifying various features of the product offering scenarios, such as the deductibles, out-of-pocket maximum, copays, or coinsurance costs. For example, a status quo modification engine 122 of the system 102 (FIG. 1) can modify the product offerings from a provider's status quo product by adjusting individual and family deductibles, out-of-pocket maximum, and/or coinsurance percentages while maintaining and/or holding constant a status quo relationship between the individual deductible and the out-of-pocket maximum within a plan tier. Similarly, the status quo modification engine 122 may adjust the relationship between a plan's individual deductible and family deductible.

If, in some implementations, the number of modified status quo scenarios has reached a predetermined threshold (804), a standard set of product offering scenarios is added (806) to the universe of scenarios from the standard set scenario generation engine 124 of the system 102. In some examples, product offering scenarios may also be generated from a standard set of individual deductible combinations by varying various product features for each of the individual deductible combinations.

In some implementations, actuarial values (AVs) with induced utilization assumptions for all plans in each scenario in the universe of scenarios may be calculated using the AV model (808). In some examples, insurance market premium (or premium equivalent) rates can be calculated by plan and coverage (810).

If, in some examples, all of the generated scenarios have been processed by the subsidy strategy engine 134 of the system 102 to calculate employee contributions (812), then a determination may be made by the subsidy strategy engine 134 of the system 102 regarding whether the employee contributions for any scenario are outside individual rate limits (814), which may be defined as the range from 0 to the premium or premium equivalent rate. If individual rates limits have been exceeded for any scenarios, then in some examples, those scenarios outside the rate limits may be discarded (816).

Although illustrated in a particular series of events, in other implementations, the steps of the product offering scenario generation process 800 may be performed in a different order. For example, generation of the standard set scenarios (806) may be performed before, after, or simultaneously with generating the modified status quo scenarios (802). Additionally, in other embodiments, the recommendation process may include more or fewer steps while remaining within the scope and spirit of the scenario generation process 800.

Figure 9:
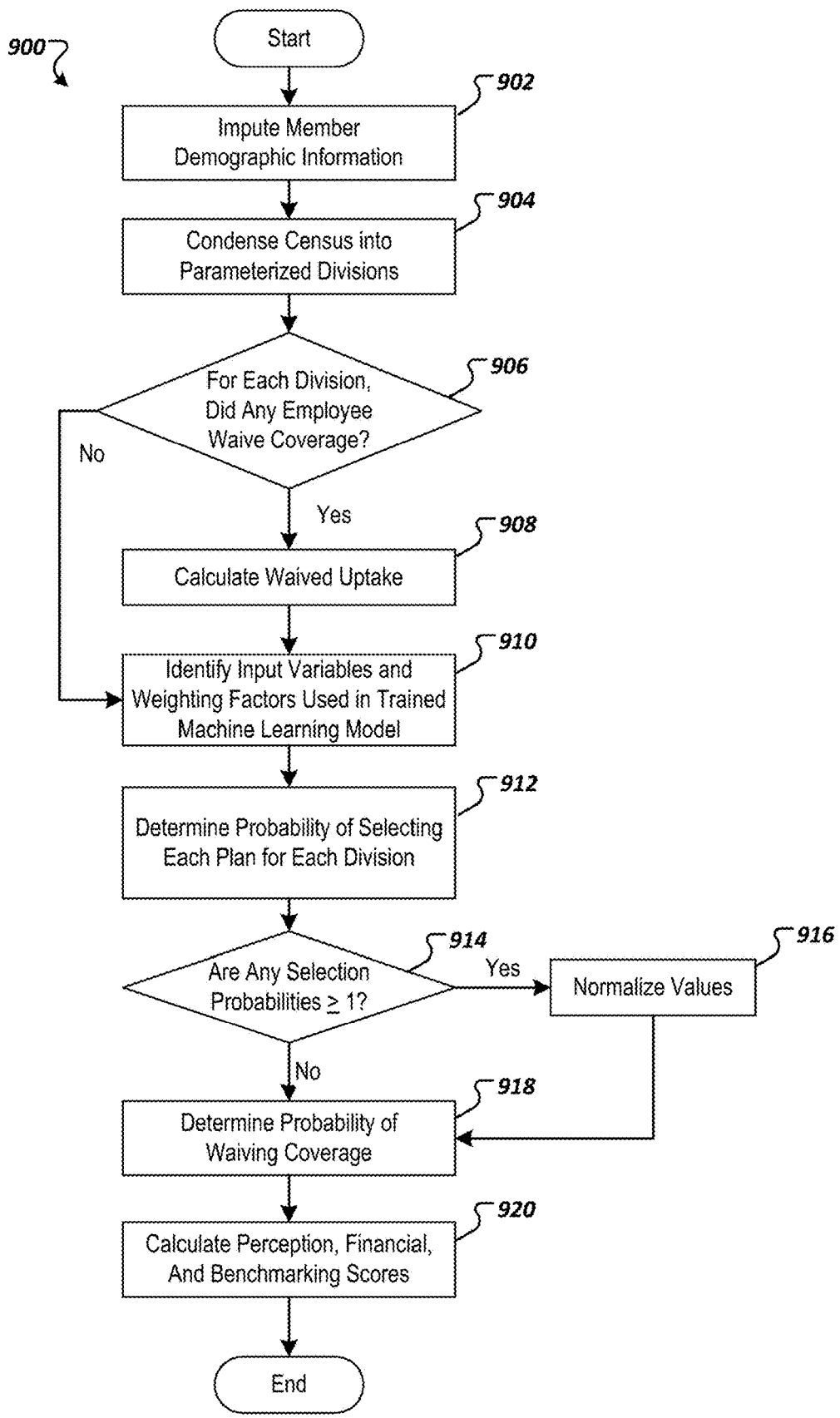
FIG. 9 illustrates a flowchart of an example process for calculating product selection probabilities.

Returning to FIG. 7, in some implementations, selection probabilities may be calculated by the census generation engine 120, algorithm training engine 126, and migration calculation engine 128 of the system 102 for each of the generated product offering scenarios and based on the selection probabilities, in some examples, an employee perception score, financial score, and one or more market competitiveness (industry benchmarking, employee perception benchmarking, etc.) scores may be calculated (710). In some examples, selection probabilities are probabilities that a member will migrate from a currently offered insurance plan to one of the plans within a particular product offering scenario or waive coverage altogether. FIG. 9 presents a flowchart of an example method 900 for calculating selection probabilities. In some implementations, the method 900 commences with imputing demographic information (e.g., risk scores, dependent count, marital status, spouse salary, etc.) for each member included in the census and imputing coverage tiers for members who waive coverage (902). The census generation engine 120, in some examples, may condense the member demographic information into a number of parameterized census categories (904) that reflect demographic features of the members as well as features of the current insurance plans held by the members.

If, in some implementations, any members waived insurance coverage within the last year (906), then the migration calculation engine 128 calculates waived uptake, which is the probability that a member who waived insurance coverage in the current year will waive coverage in the upcoming year based on the offered product scenarios (908). In some examples, the waived uptake probability may be calculated as a probability of reentering the insurance pool based on the ratio of the cheapest plan's contribution to the member's salary.

In some implementations, based on the characteristics and preferences of the client (employer) and employees, the algorithm training engine 126 identifies customized training variables and weighting factors (910) that are used in the trained machine learning model, which calculates the selection probabilities. For example, the input variables may include risk score category assignment, plan similarity to status quo, plan richness, change in contribution amount, and change in deductible as a percentage of salary. Additionally, the machine learning algorithm may be trained with large data sets of member data for multiple clients and companies. In other examples, the machine learning algorithm may be trained with training data for members of the same company as the client.

In some implementations, for each census category division, the migration calculation engine 128 calculates a selection probability for each plan within each of the possible product offering scenarios (912). Additionally, the migration calculation engine 128 may normalize the selection probabilities (916), in some implementations, for any selection probabilities that are greater than or equal to one (914). Additionally, in some embodiments, for each of the census category divisions, the migration calculation engine 128 calculates a probability of waiving insurance coverage (918). In some examples, the selection probabilities and waived coverage probabilities may be calculated for each census category division.

In some embodiments, the selection probabilities and waived coverage probabilities for each of the census categories and category divisions are used by a product recommendation engine 136 of the system 102 to calculate a financial score, an industry benchmarking score, and an employee perception score for each of the product offering scenarios (920). In one example, a consolidated optimization score may be calculated for each of the product offering scenarios, which is a weighted combination of the financial, market competitiveness (e.g., industry benchmarking score and/or employee perception benchmarking score), and employee perception scores.

Although illustrated in a particular series of events, in other implementations, the steps of the selection probability calculation process 900 may be performed in a different order. For example, identification of the training variables and weighting factors (910) may be performed before, after, or simultaneously with the condensing census data into parameterized category divisions (904). Additionally, in other embodiments, the recommendation process may include more or fewer steps while remaining within the scope and spirit of the selection probability calculation process 900.

Returning to FIG. 7, in some embodiments, any product offering scenarios that fall outside constraints (712) for the financial, industry benchmarking, employee perception score benchmarking, and employee perception scores are discarded (714). In some implementations, any of the product offering scenarios that fall within the constraints are presented to the client in one or more dynamically adjustable GUI screens (716). For example, the GUI screens can include those illustrated in FIGS. 5A-5B as well as FIGS. 6C-6G.

In some implementations, the GUI screens that are output to the client include filter user interfaces that provide for adjustment of scenario display preferences. For example, as shown in FIG. 5E, the filter settings may include adjustments of minimum and maximum values for displayed financial scores, employee perception scores, and deductibles as well as numbers of plans included within displayed scenarios and types of plans (PPO, HMO, HDHP) that are displayed on the output GUI screens. Additionally, in some examples, the adjustments provided by the user may also include inputting user-defined scenarios at GUI screen 530 (FIG. 5C).

If, in some embodiments, a filter and/or scenario adjustment is received (718), then the computing system dynamically adjusts the GUI output display (720) in real-time to reflect the adjustments. In some examples, when a filter adjustment and/or user-defined scenario is received, the migration calculation engine 128 recalculates the selection probabilities and the product recommendation engine 136 recalculates the financial, employee perception, and industry benchmarking scores and adjusts the recommended product offering scenarios as necessary.

In some embodiments, the GUI screens allow clients to select scenarios from a graphical plot, such as GUI screen 500 in FIG. 5E, which can be received by the computing system (722), stored in a scenario library for later consideration by the client (724), and later output to a GUI by a GUI engine 132 of the system 102 that summarizes the selected scenarios and/or used to generate a report that can be sent to the client (726).

Although illustrated in a particular series of events, in other implementations, the steps of the product recommendation process 700 may be performed in a different order. For example, adjusting the GUI screen 500 in response to a filter and/or scenario adjustment (720) may be performed before, after, or simultaneously with adding scenario selections to the scenario library (724). Additionally, in other embodiments, the recommendation process may include more or fewer steps while remaining within the scope and spirit of the product recommendation process 700.

Figure 10:
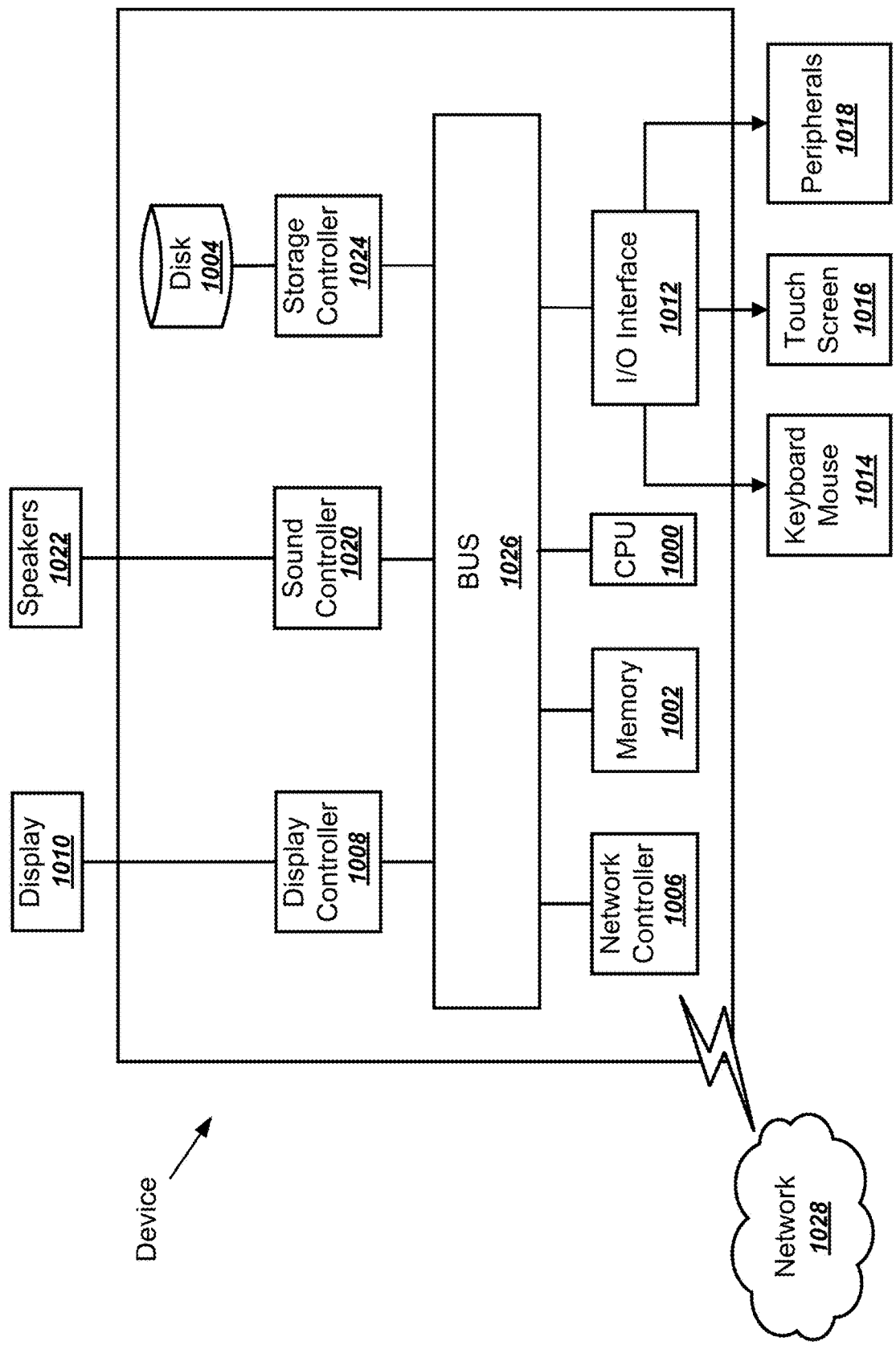
FIGS. 10-11 illustrate example computing systems on which the processes described herein can be implemented.

Next, a hardware description of the computing device, mobile computing device, or server according to exemplary embodiments is described with reference to FIG. 10. The hardware, in some examples, can describe broker devices 104, provider devices 106, and one or more computing devices implementing the engines of the subscription product management system 102 of FIG. 1. In further examples, the hardware description may be applicable to the front-end device 202 and one or more computing devices implementing the engines 226, 230 and APIs 204, 206 as described in FIG. 2. Each of the client 302, the platform 304, and the broker 306 systems may be implemented using one or more computing devices as described below. In FIG. 10, the computing device, mobile computing device, or server includes a CPU 1000 which performs the processes described above. The process data and instructions may be stored in memory 1002. These processes and instructions may also be stored on a storage medium disk 1004 such as a hard drive (HDD) or portable storage medium or may be stored remotely. The data repository 112 of FIG. 1 and databases 222, 224, 228, and 232 of FIG. 2, for example, may be implemented as one or more storage medium disks 1004. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer.

Further, a portion of the claimed advancements may be provided as a utility application, background daemon, or component of an operating system, or combination thereof, executing in conjunction with CPU 1000 and an operating system such as Microsoft Windows 6, UNIX, Solaris, LINUX, Apple MAC-OS and other systems known to those skilled in the art.

CPU 1000 may be a Xenon or Core processor from Intel of America or an Opteron processor from AMD of America, or may be other processor types that would be recognized by one of ordinary skill in the art. Alternatively, the CPU 1000 may be implemented on an FPGA, ASIC, PLD or using discrete logic circuits, as one of ordinary skill in the art would recognize. Further, CPU 1000 may be implemented as multiple processors cooperatively working in parallel to perform the instructions of the inventive processes described above. In some examples, the processing circuitry of the CPU 1000 (e.g., one or more processors such as the CPU 1000) may execute instructions for performing the algorithms and methods described in relation to the engines 116, 118, 120, 122, 124, 126, 128, 130, 132, 134, and 136 of FIG. 1, as well as the engines 226 and 230 of FIG. 2. Further, the processing circuitry of the CPU 1000 (e.g., one or more processors such as the CPU 1000) may execute instructions for enabling the interfaces and communications described in relation to the APIs 204 and the 206 of FIG. 2. Further, the processing circuitry of the CPU 1000 (e.g., one or more processors such as the CPU 1000) may execute instructions for performing the algorithms and methods described in relation to the client 302, platform 304, and broker 306 of FIG. 3.

The computing device, mobile computing device, or server in FIG. 10 also includes a network controller 1006, such as an Intel Ethernet PRO network interface card from Intel Corporation of America, for interfacing with network 1028. As can be appreciated, the network 1028 can be a public network, such as the Internet, or a private network such as an LAN or WAN network, or any combination thereof and can also include PSTN or ISDN sub-networks. The network 1028 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The computing device, mobile computing device, or server further includes a display controller 1008, such as a NVIDIA GeForce GTX or Quadro graphics adaptor from NVIDIA Corporation of America for interfacing with display 1010, such as a Hewlett Packard HPL2445w LCD monitor. A general purpose I/O interface 1012 interfaces with a keyboard and/or mouse 1014 as well as a touch screen panel 1016 on or separate from display 1010. General purpose I/O interface also connects to a variety of peripherals 1018 including printers and scanners, such as an OfficeJet or DeskJet from Hewlett Packard. Display technology 1008, 1010 and I/O peripherals 1012, 1014, and 1016 may be used, for example, to allow the front end 202 of FIG. 2 to interact with the remainder of the system. The providers 106 and brokers 104 of FIG. 1 may interact with the subscription product management system 102 through display technology 1008, 1010 and I/O peripherals 1012, 1014, and 1016. In some examples, the user interfaces of FIGS. 4A-B, FIGS. 5A-G, and FIGS. 6A-G may be rendered using display technology 1008, 1010, and user feedback may be entered via the user interfaces of FIGS. 4A-B, FIGS. 5A-G, and FIGS. 6A-G using I/O peripherals 1012, 1014, and 1016.

A sound controller 1020 is also provided in the computing device, mobile computing device, or server, such as Sound Blaster X-Fi Titanium from Creative, to interface with speakers/microphone 1022 thereby providing sounds and/or music.

The general purpose storage controller 1024 connects the storage medium disk 1004 with communication bus 1026, which may be an ISA, EISA, VESA, PCI, or similar, for interconnecting all of the components of the computing device, mobile computing device, or server. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, where the processors are distributed across multiple components communicating in a network. The distributed components may include one or more client and server machines, which may share processing, as shown on FIG. 11, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Figure 11:
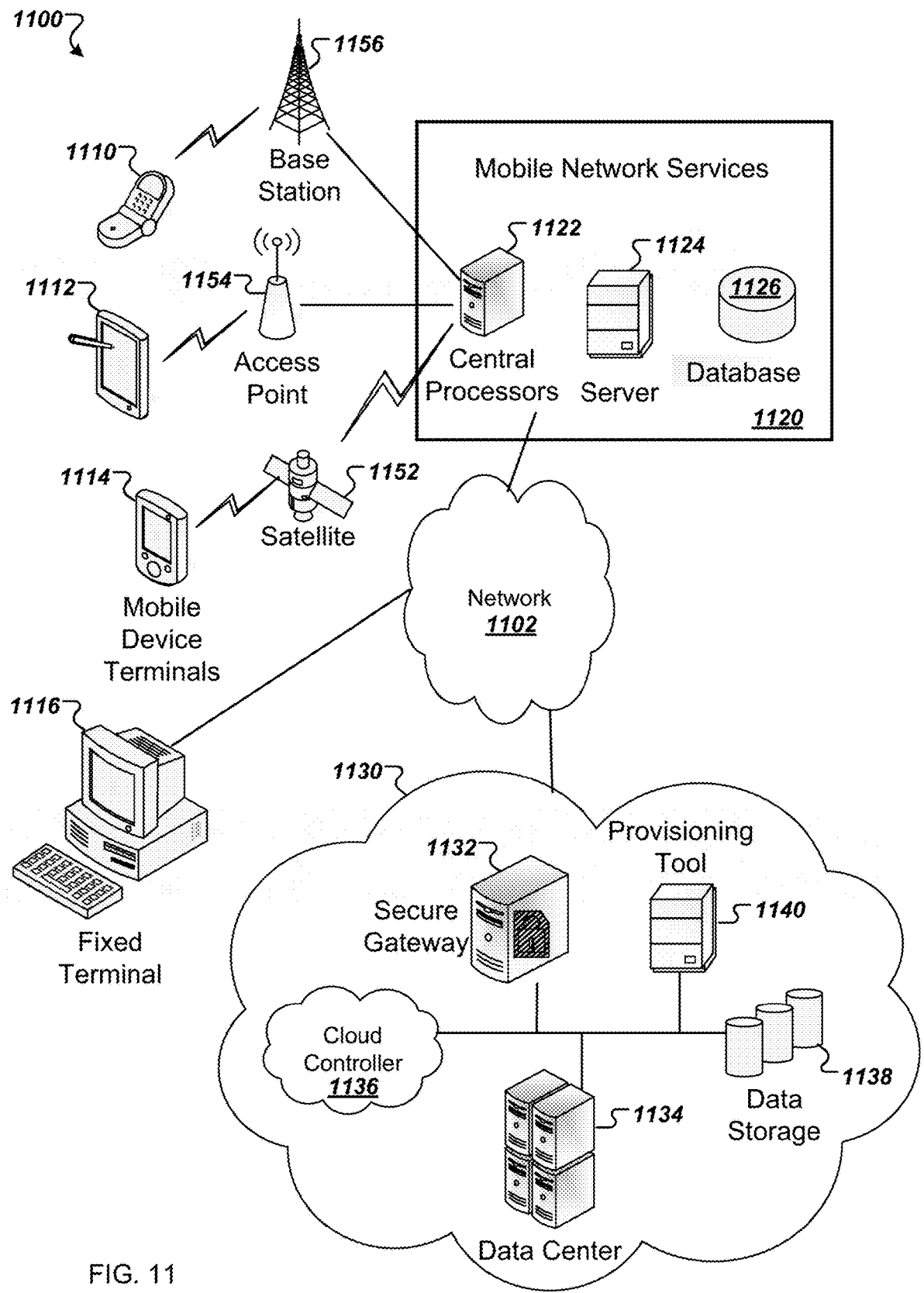

In some implementations, as illustrated in FIG. 11, the innovations described herein may interface with a cloud computing environment 1130, such as Google Cloud Platform™ to perform at least portions of methods or algorithms detailed above. For example, the subscription product management system 102 and engines thereof may be implemented in a distributed cloud computing environment, accessed via a network by the members 108, brokers 104, and providers 106. Further, a portion of the elements of FIG. 2 may be implemented in a distributed cloud computing environment. The processes associated with the methods described herein can be executed on a computation processor, such as the Google Compute Engine by data center 1134 (e.g., similar to the CPU 1000 of FIG. 10). The data center 1134, for example, can also include an application processor, such as the Google App Engine, that can be used as the interface with the systems described herein to receive data and output corresponding information. The cloud computing environment 1130 may also include one or more databases 1138 or other data storage, such as cloud storage and a query database. For example, the data repository 112 of FIG. 1 and databases 222, 224, 228, and 232 of FIG. 2 may be implemented as cloud storage. In some implementations, the cloud storage database 1138, such as the Google Cloud Storage, may store processed and unprocessed data supplied by systems described herein.

The systems described herein may communicate with the cloud computing environment 1130 through a secure gateway 1132. In some implementations, the secure gateway 1132 includes a database querying interface, such as the Google BigQuery platform.

The cloud computing environment 1130 may include a provisioning tool 1140 for resource management. The provisioning tool 1140 may be connected to the computing devices of a data center 1134 to facilitate the provision of computing resources of the data center 1134. The provisioning tool 1140 may receive a request for a computing resource via the secure gateway 1132 or a cloud controller 1136. The provisioning tool 1140 may facilitate a connection to a particular computing device of the data center 1134.

A network 1102 represents one or more networks, such as the Internet, connecting the cloud environment 1130 to a number of client devices such as, in some examples, a cellular telephone 1110 via base station 1156, a tablet computer 1112 via access point 1154, a mobile computing device 1114 via satellite communications system 1152, and a desktop computing device 1116. The network 1102 can also communicate via wireless networks using a variety of mobile network services 1120 such as Wi-Fi, Bluetooth, cellular networks including EDGE, 3G and 4G wireless cellular systems, or any other wireless form of communication that is known. In some embodiments, the network 1102 is agnostic to local interfaces and networks associated with the client devices to allow for integration of the local interfaces and networks configured to perform the processes described herein. As illustrated in FIG. 1, a medical records network may interface with a subscription product management network (e.g., the Internet), and providers 106, members 108, and brokers 104 may each connect to the subscription product management network via a wired or wireless interface.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A method for anticipating member satisfaction with each of a plurality of product offerings and applying satisfaction scoring to product offering options, the method comprising:

based on
  i) a set of demographic features of a population of individuals, the set of demographic features, for each respective individual of the population of individuals, comprising one or more of a salary, a salary range indication, a type of employee, a regional location, an age, or an age range indication of the respective individual, and
  ii) historic selection data comprising a) sets of survey data submitted by at least a first portion of the population of individuals, each set of survey data comprising, for each respective individual of the population of individuals, indications of satisfaction with each characteristic of a plurality of product characteristics of a product previously selected by the respective individual of the first portion of the population of individuals, and b) sets of member data of at least a second portion of the population of individuals, each set of member data corresponding to membership of a respective individual within a given organization of a plurality of organizations, each set of member data including a plurality of characteristics of a selected product offering of the plurality of product offerings selected by the respective individual within the given organization, training, by one or more processors, at least one machine learning model using the historic selection data to predict a probability of a given person selecting a given product offering of the plurality of product offerings based on a plurality of characteristics of the given product offering and at least one demographic feature of the given person, and periodically updating, by the one or more processors, the training of the at least one machine learning model as new historic selection data is acquired, including promoting, within the training, the importance of a portion of the historic selection data acquired within a most recent calendar year;

accessing, by the one or more processors, demographic information for each member of a member population belonging to a first organization;

using the demographic information, dividing, by the one or more processors, the member population into a set of demographic divisions based on one or more groupings of demographic features of members of the member population and into a set of parameterized demographic divisions based further on characteristics of a current insurance plan held by each member of the member population, wherein
the one or more groupings of demographic features each include one or more demographic features of the set of demographic features;

applying, by the one or more processors, the at least one machine learning model to the set of parameterized demographic divisions to obtain, for each respective parameterized demographic division, a probability of the members of the respective parameterized demographic division selecting each product offering of the plurality of product offerings;

calculating, by the one or more processors using the probability of the members of each respective parameterized demographic division selecting each product offering, an employee perception score corresponding to each product offering of the plurality of product offerings for the respective parameterized demographic division;

using the set of demographic divisions, identifying, by the one or more processors, a set of peer entities to the first organization sharing similarities in the set of demographic divisions, wherein, for each demographic division of the set of demographic divisions, each peer of the set of peer entities differs in distribution of the members across the one or more groupings by no more than a threshold value corresponding to the respective demographic division;

determining, by the one or more processors from the set of peer entities, at least one perception benchmark score representing a level of peer member satisfaction with the product offering options provided by the set of peer entities to respective members of the peer entities, wherein determining each perception benchmark score of the at least one perception benchmark score comprises:
identifying at least one peer perception score of each peer of the set of peer entities, and
calculating an average or median of the peer perception scores of the set of peer entities to determine each perception benchmark score of the at least one perception benchmark score; and presenting, by the one or more processors for review by a representative of the first organization a graphical user interface with at least one adjustable filter control, the graphical user interface comprising at least a portion of the plurality of product offerings and at least one of a relative comparison or an absolute comparison of the employee perception score to the at least one perception benchmark score.

2. The method of claim 1, wherein identifying the set of peer entities comprises identifying similarities between the first organization and each entity of the set of peer entities, wherein the similarities comprise one or more of an industry, a type of the organization, a size of the member population, or a geographic region.

3. The method of claim 1, wherein the at least one perception benchmark score comprises a median perception benchmark score and at least one higher percentile perception benchmark score.

4. The method of claim 1, wherein the at least one peer perception score of each peer of the set of peer entities is based on actual selection of insurance plans by the members of the respective peer.

5. The method of claim 4, wherein the actual selection comprises selection performed within a past year.

6. The method of claim 1, wherein the plurality of characteristics comprises one or more of a member contribution amount, a deductible amount, a member contribution amount as a percentage of member salary, or a deductible amount as a percentage of member salary.

7. The method of claim 1, wherein presenting the portion of the plurality of product offerings comprises:
presenting the portion of the plurality of product offerings as elements arranged in a scatter plot graphing cost versus member perception; and
presenting the at least one perception benchmark score as a level marking across the scatter plot.

8. The method of claim 7, wherein the at least one adjustable filter control is configured to narrow the portion of the plurality of product offerings on a basis of the cost or the member perception.

9. The method of claim 1, wherein training the at least one machine learning model comprises training the at least one machine learning model further using survey data obtained from a survey population, wherein the survey data identifies a portion of the plurality of characteristics as being valued by the survey population.

10. A system comprising one or more processors configured to perform operations for anticipating member satisfaction with each of a plurality of product offerings and applying satisfaction scoring to product offering options, the operations being a) stored as programming instructions to a non-transitory computer readable medium and/or b) programmed to logic circuits of at least a portion of the one or more processors, the operations comprising:
storing demographic information for each member of a member population belonging to a first organization;
based on
i) a set of demographic features of a population of individuals, the set of demographic features comprising, for each respective individual of the population of individuals, one or more of a salary, a salary range indication, a type of employee, a regional location, an age, or an age range indication of the respective individual, and
ii) historic selection data comprising a) sets of survey data submitted by at least a first portion of the population of individuals, each set of survey data comprising, for each respective individual of the population of individuals, indications of satisfaction with each characteristic of a plurality of product characteristics of a product previously selected by the respective individual of the first portion of the population of individuals, and b) sets of member data of at least a second portion of the population of individuals, each set of member data corresponding to membership of a respective individual within a given organization of a plurality of organizations, each set of member data including a plurality of characteristics of a selected product offering of the plurality of product offerings selected by the respective individual within the given organization, training at least one machine learning model using the historic selection data to predict a probability of a given person selecting a given product offering of the plurality of product offerings based on a plurality of characteristics of the given product offering and at least one demographic feature of the given person, and periodically updating the training of the at least one machine learning model as new historic selection data is acquired, including promoting, within the training, the importance of a portion of the historic selection data acquired within a most recent calendar year;

accessing the demographic information;

using the demographic information, dividing the member population into a set of demographic divisions based on one or more groupings of demographic features of members of the member population and into a set of parameterized demographic divisions based further on characteristics of a current insurance plan held by each member of the member population, wherein the one or more groupings of demographic features each include one or more demographic features of the set of demographic features;

applying the at least one machine learning model to the set of parameterized demographic divisions to obtain, for each respective parameterized demographic division, a probability of the members of the respective parameterized demographic division selecting each product offering of the plurality of product offerings;

calculating, using the probability of the members of each respective parameterized demographic division selecting each product offering, an employee perception score corresponding to each product offering of the plurality of product offerings for the respective parameterized demographic division;

using the set of demographic divisions, identifying a set of peer entities to the first organization sharing similarities in the set of demographic divisions, wherein, for each demographic division of the set of demographic divisions, each peer of the set of peer entities differs in distribution of the members across the one or more groupings of demographic features by no more than a threshold value corresponding to the respective demographic division;

determining, from the set of peer entities, at least one perception benchmark score representing a level of the member satisfaction with the product offering options provided by the set of peer entities to respective members of the peer entities, wherein determining each perception benchmark score of the at least one perception benchmark score comprises:

identifying at least one peer perception score of each peer of the set of peer entities, and calculating an average or median of the peer perception scores of the set of peer entities to determine each perception benchmark score of the at least one perception benchmark score; and presenting, for review by a representative of the first organization, a graphical user interface with at least one adjustable filter control, the graphical user interface comprising at least a portion of the plurality of product offerings and at least one of a relative comparison or an absolute comparison of the employee perception score to the at least one perception benchmark score.

11. The system of claim 10, wherein identifying the set of peer entities comprises identifying similarities between the first organization and each entity of the set of peer entities, wherein the similarities comprise one or more of an industry, a type of the organization, a size of the member population, or a geographic region.

12. The system of claim 10, wherein the at least one perception benchmark score comprises a median perception benchmark score and at least one higher percentile perception benchmark score.

13. The system of claim 10, wherein the at least one peer perception score of each peer of the set of peer entities is based on actual selection of insurance plans by the members of the respective peer.

14. The system of claim 13, wherein the actual selection comprises selection performed within a past year.

15. The system of claim 10, wherein the plurality of characteristics comprises one or more of a member contribution amount, a deductible amount, a member contribution amount as a percentage of member salary, or a deductible amount as a percentage of member salary.

16. The system of claim 10, wherein presenting the portion of the plurality of product offerings comprises:

presenting the portion of the plurality of product offerings as elements arranged in a scatter plot graphing cost versus member perception; and presenting the at least one perception benchmark score as a level marking across the scatter plot.

17. The system of claim 16, wherein the at least one adjustable filter control is configured to narrow the portion of the plurality of product offerings on a basis of the cost or the member perception.

18. The system of claim 10, wherein training the at least one machine learning model comprises training the at least one machine learning model further using survey data obtained from a survey population, wherein the survey data identifies a portion of the plurality of characteristics as being valued by the survey population.

* * * * *